(12) United States Patent
Ipposhi

(10) Patent No.: US 12,496,897 B2
(45) Date of Patent: Dec. 16, 2025

(54) ELECTRIC VEHICLE DRIVING DEVICE

(71) Applicant: Mitsubishi Electric Corporation, Tokyo (JP)

(72) Inventor: Shigetoshi Ipposhi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 128 days.

(21) Appl. No.: 18/588,855

(22) Filed: Feb. 27, 2024

(65) Prior Publication Data

US 2025/0083514 A1    Mar. 13, 2025

(30) Foreign Application Priority Data

Sep. 12, 2023   (JP) .................. 2023-147312

(51) Int. Cl.
  *B60K 11/04*      (2006.01)
  *B60K 1/00*       (2006.01)

(52) U.S. Cl.
  CPC ............... *B60K 11/04* (2013.01); *B60K 1/00* (2013.01); *B60K 2001/006* (2013.01)

(58) Field of Classification Search
  CPC ..... B60K 11/04; B60K 1/00; B60K 2001/006
  USPC ........................................... 165/41; 180/68.4
  See application file for complete search history.

(56) References Cited

U.S. PATENT DOCUMENTS 10,464,633 B2 *  11/2019  Zhu ..................... B62M 11/02
12,337,674 B2 *   6/2025  Wu ..................... H05K 7/20927
2018/0119598 A1 *  5/2018  Mori .................... F01P 11/08
2018/0339583 A1 * 11/2018  Hirai ..................... B60L 9/18
2022/0266651 A1 *  8/2022  Jeong ................. B60H 1/2221
2023/0100546 A1 *  3/2023  Kesti ..................... B60L 53/16
                                                        165/80.4
2023/0311638 A1 * 10/2023  Mikuni ................... B60K 1/00
                                                         180/68.4
2025/0083513 A1 *  3/2025  Ipposhi ................. B60K 6/445
2025/0083514 A1 *  3/2025  Ipposhi ................. B60K 11/04

FOREIGN PATENT DOCUMENTS

| JP | 4625597 B2     |   | 2/2011  |
|----|----------------|---|---------|
| JP | 2015-186343 A  |   | 10/2015 |
| JP | 6926984 A      |   | 8/2021  |
| JP | 7140727 B2     | * | 9/2022  |

* cited by examiner

Primary Examiner — Claire E Rojohn, III

(74) Attorney, Agent, or Firm — Sughrue Mion, PLLC

(57) ABSTRACT

This electric vehicle driving device includes: a motor; a gear box storing a speed reduction mechanism, and a differential mechanism; a final gear shaft of which one side is connected to the differential mechanism; a support structure supporting another side of the final gear shaft; and a radiator. The motor and the final gear shaft are arranged so as to be opposed to each other with an interval provided therebetween. The gear box is provided on one side in an X direction of the motor and the final gear shaft, and the support structure is provided on another side in the X direction of the motor and the final gear shaft. The radiator is provided on any one or two direction sides of another side in a Y direction, one side in a Z direction, and another side in the Z direction with respect to the final gear shaft.

16 Claims, 19 Drawing Sheets

FIG. 2A
FIG. 2B
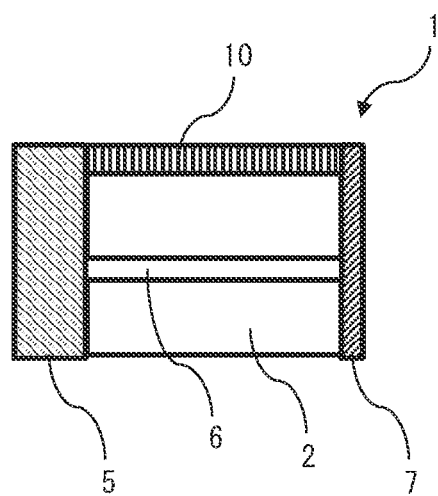
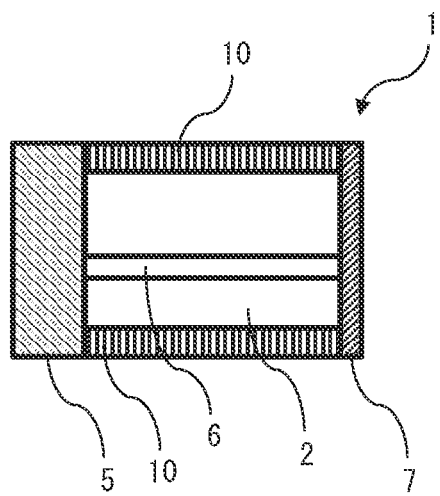

ELECTRIC VEHICLE DRIVING DEVICE

BACKGROUND

The present disclosure relates to an electric vehicle driving device.

In recent years, vehicles in which an internal combustion engine driven by being supplied with fuel from a fuel tank is used as motive power are being rapidly replaced with electric vehicles in which a motor driven by being supplied with electricity from a battery is used as motive power. In addition, on-vehicle devices for traveling of an electric vehicle have been arranged in an increasingly concentrated manner. Many of electric vehicle driving devices for traveling of an electric vehicle are configured such that mainly a motor for producing motive power, a speed reducer for transmitting, to a vehicle shaft, motive power with the speed of the motor reduced, and an inverter for converting DC current stored in a battery to desired AC current to efficiently perform drive control of the motor, are integrated. In each of the motor, the speed reducer, and the inverter, loss is generated through energy conversion or motive power transmission. Heat generation caused by the loss increases a local temperature of each device. Excessive increase in the local temperature of each device can cause failure of the electric vehicle driving device. Therefore, it is necessary to appropriately cool the electric vehicle driving device.

A general cooling structure for cooling the electric vehicle driving device is formed of an oil-cooled system which circulates oil in the electric vehicle driving device and an external-water-cooled system which supplies cooling water from the outside to an oil cooler which is a part of the oil-cooled system (for example, Patent Document 1). In the oil-cooled system, oil accumulated at a lower part in a housing storing a speed reducer is supplied through the oil cooler and one or a plurality of oil passages to a heat generation portion by an oil pump. By the oil contacting with the heat generation portion directly or indirectly, the oil absorbs heat, so that the heat generation portion is cooled, and the temperature-increased oil circulates back to the lower part in the housing again. The external-water-cooled system is formed by connecting a radiator, a water pump, a water-cooled plate of an inverter, and the oil cooler by a pipe. The cooling water in the external-water-cooled system circulates by driving of the water pump.

With this configuration, the cooling water is supplied from the external-water-cooled system to the oil cooler, and the high-temperature oil circulating in the oil-cooled system undergoes heat exchange with the cooling water at the oil cooler, whereby lowered-temperature oil can be supplied to the heat generation portion. Meanwhile, in the external-water-cooled system, the cooling water absorbs heat from the high-temperature oil at the oil cooler, and the temperature-increased cooling water dissipates heat at the radiator to the surrounding air. Low-temperature cooling water flowing out from the radiator is supplied to the oil cooler again. In oil circulation in the oil-cooled system and cooling water circulation in the external-water-cooled system, heat is transferred from the heat generation portion of the electric vehicle driving device to the radiator via the oil and the cooling water, and the heat is released from the radiator to the surrounding air. The external-water-cooled system is often provided with a fan for sending air to the radiator in order to more efficiently cool the cooling water and a reservoir tank ensuring a sufficient cooling water amount in order to suppress entry of air into the pipe of the external-water-cooled system.

In the electric vehicle, a battery is mounted instead of a fuel tank in a conventional vehicle. In order to increase the cruising range of the electric vehicle, it is desired to reduce the weights of the electric vehicle and the electric vehicle driving device, increase the battery mounting capacity (expand a battery mounting space), and improve the energy conversion efficiency including reduction in power consumption. In the structure in Patent Document 1, it is possible to appropriately cool the electric vehicle driving device by providing the oil-cooled system and the external-water-cooled system. However, since the electric vehicle driving device is provided with both of the oil-cooled system and the external-water-cooled system, the size of the electric vehicle driving device increases and the weight of the electric vehicle driving device increases, thus having a problem that the weights of the electric vehicle and the electric vehicle driving device cannot be reduced and a problem that the battery mounting space cannot be enlarged. In addition, since the external-water-cooled system is needed, there is a problem that it is not easy to mount the electric vehicle driving device into the electric vehicle.

In order to increase the cruising range of the electric vehicle, configurations in which the weight and the size of an electric vehicle driving device are reduced are disclosed (for example, Patent Documents 2, 3, 4). Patent Document 2 discloses a configuration in which oil accumulated at a lower part in a housing storing a speed reducer is circulated in order of an oil pump, a motor, a cooler, an inverter (PDU), and then a differential mechanism, by an oil pump using rotational movement of the speed reducer, and a configuration in which air is sent to an oil cooler by a fan using rotational movement of the motor so as to efficiently cool the circulating oil. Patent Document 3 discloses a configuration of an electric vehicle driving device in which an impeller is provided to a drive shaft to which a tire is attached. This configuration air-cools oil in a motor of the electric vehicle driving device provided side by side with the impeller, without cost increase. Patent Document 4 discloses a configuration of an electric vehicle driving device in which an opening is provided at a rear of the electric vehicle and a passage is provided so that air can pass from the opening to a lower surface of the electric vehicle via an oil cooler.

Patent Document 1: Japanese Patent No. 7140727
Patent Document 2: Japanese Patent No. 4625597
Patent Document 3: Japanese Laid-Open Patent Publication No. 2015-186343
Patent Document 4: Japanese Patent No. 6926984

In the structure in Patent Document 2, the external-water-cooled system is not needed and therefore the weights of the electric vehicle and the electric vehicle driving device can be reduced. In addition, as the driving forces for the oil pump and the fan, a rotational force of the motor is used directly or indirectly via the speed reducer and therefore power consumption can be reduced. However, in general, the maximum rotational speed of a motor used in an electric vehicle is not less than 18,000 rpm and thus is a high speed. Therefore, in the configuration in Patent Document 2, a fan whose maximum rotational speed is up to 3,000 rpm, which is often used for consumers and in general industry, cannot be used. It is necessary to use a fan reinforced to have a great strength, so that the fan becomes expensive and increases in size, thus having a problem that the electric vehicle driving device is not reduced in weight and increases in size. In addition, the fan and the cooler are arranged in series in the axial direction of the motor, so that the volume efficiency is low, thus having a problem that the size of the electric vehicle driving device increases.

In Patent Document 3, since the impeller is provided to the drive shaft, oil in the motor provided side by side with the impeller is air-cooled without cost increase. However, in this configuration, traveling wind passing under the motor is scooped up by the impeller, and therefore it is difficult to change flow of the traveling wind even by the impeller rotating in an opened space, thus having a problem that the motor of the electric vehicle driving device cannot be efficiently cooled. In addition, in general, a drive shaft is attached so as to extend in an oblique direction as seen in the axial direction of a motor and thus serves to absorb a front-rear or up-down motion of a tire. Therefore, the drive shaft greatly moves and the angle of the oblique direction changes, so that the electric vehicle driving device and the impeller might contact with each other and further, the impeller might be damaged.

In Patent Document 4, the oil cooler is cooled by air passing without using a fan, and therefore power consumption in the electric vehicle can be reduced. In addition, as in Patent Document 2, the external-water-cooled system is not needed and therefore the weights of the electric vehicle and the electric vehicle driving device can be reduced. However, a pressure difference between the opening at the rear of the electric vehicle and the lower surface of the electric vehicle is used as an air-passing driving force, and therefore the air-passing driving force is greatly influenced by the vehicle driving state (speed, zigzag traveling, etc.) and the surrounding environment (weather, speed and direction of surrounding wind, conditions regarding surrounding vehicles (distances and relative speeds), etc.). Thus, uncertainty of the passing air amount is high and it is difficult to obtain an air-passing driving force that is physically great. Moreover, high-temperature air discharged from the electric vehicle driving device itself or a surrounding vehicle might be sucked from the opening at the rear of the electric vehicle. As a result, it is impossible to suck a stable amount of low-temperature air that can sufficiently cool the electric vehicle driving device, thus having a problem that the electric vehicle driving device cannot be efficiently cooled. Further, air needs to be sent with small pressure loss to the lower surface of the electric vehicle from the rear of the electric vehicle where the oil cooler is stored. As a result, the air passage is expanded and the volume efficiency is low, thus having a problem that the size of the electric vehicle driving device increases.

SUMMARY

Accordingly, an object of the present disclosure is to provide an electric vehicle driving device that enables efficient cooling, weight reduction, and size reduction, and can be easily mounted into an electric vehicle.

An electric vehicle driving device according to the present disclosure includes: a motor having a rotary shaft; a gear box storing a speed reduction mechanism connected to the rotary shaft, and a differential mechanism connected to the speed reduction mechanism; a final gear shaft of which one side is connected to the differential mechanism; a support structure supporting another side of the final gear shaft and fixed to the motor; and a radiator which cools the electric vehicle driving device. The motor and the final gear shaft are arranged so as to be opposed to each other with an interval provided therebetween. An extending direction of the final gear shaft is defined as an X direction, a direction which is perpendicular to the X direction and in which the motor is provided with respect to the final gear shaft is defined as one side in a Y direction, and a direction perpendicular to the X direction and the Y direction is defined as a Z direction. The gear box is provided on one side in the X direction of the motor and the final gear shaft, and the support structure is provided on another side in the X direction of the motor and the final gear shaft. The radiator is provided on any one or two direction sides of another side in the Y direction, one side in the Z direction, and another side in the Z direction with respect to the final gear shaft.

In the electric vehicle driving device according to the present disclosure, the motor and the final gear shaft are arranged so as to be opposed to each other with an interval provided therebetween. The gear box is provided on the one side in the X direction of the motor and the final gear shaft, and the support structure is provided on the other side in the X direction of the motor and the final gear shaft. The radiator is provided on any one or two direction sides of the other side in the Y direction, the one side in the Z direction, and the other side in the Z direction with respect to the final gear shaft. Thus, an air passage and the radiator are provided around the final gear shaft, and heat generated inside the electric vehicle driving device can be dissipated without the need of the external-water-cooled system, whereby the electric vehicle driving device can be efficiently cooled. Since the external-water-cooled system is not needed, the weight and the size of the electric vehicle driving device can be reduced. Since the weight and the size of the electric vehicle driving device are reduced, more batteries can be mounted in the electric vehicle, whereby the cruising range of the electric vehicle can be increased. In addition, since the external-water-cooled system is not needed and a cooling mechanism formed by the air passage and the radiator is integrated with the electric vehicle driving device, the electric vehicle driving device can be easily mounted into the electric vehicle.

BRIEF DESCRIPTION OF THE DRAWINGS

FIGS. 2A and 2B are front views schematically showing the electric vehicle driving device according to the first embodiment;

DETAILED DESCRIPTION OF THE EMBODIMENTS

Figure 1A:
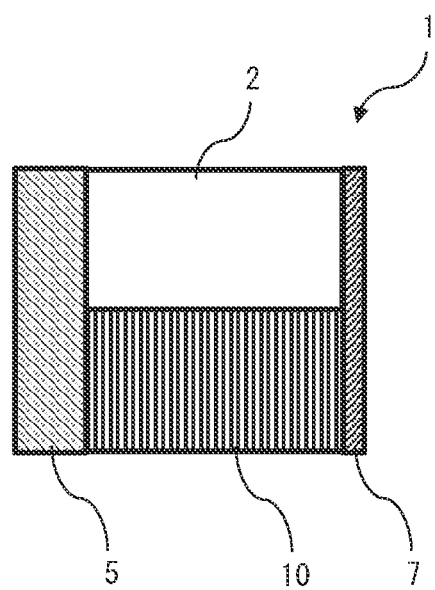
FIGS. 1A and 1B are plan views schematically showing an electric vehicle driving device according to the first embodiment of the present disclosure.

Hereinafter, an electric vehicle driving device according to embodiments of the present disclosure will be described with reference to the drawings. In the drawings, the same or corresponding members and parts are denoted by the same reference characters, to give description. An electric vehicle in the present disclosure is not limited to an automobile and refers to mobility means used as traffic means, transportation means, movement means, or the like, including a two-wheel vehicle.

First Embodiment

Figure 1B:
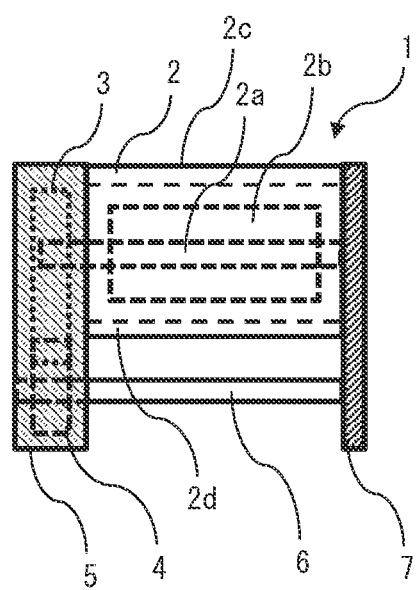
Figure 1B:
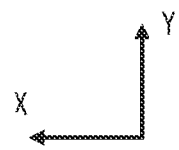
Figure 1B:
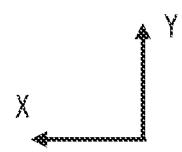
Figure 3:
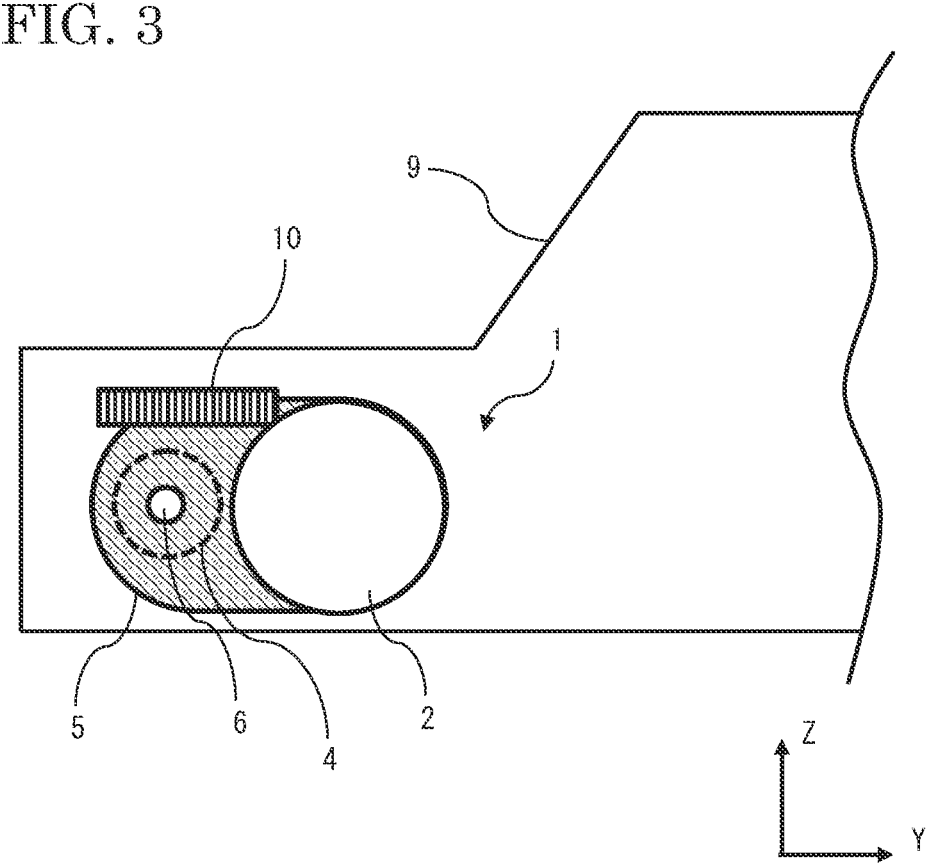
FIG. 3 is a side view schematically showing the electric vehicle driving device according to the first embodiment.
Figure 4:
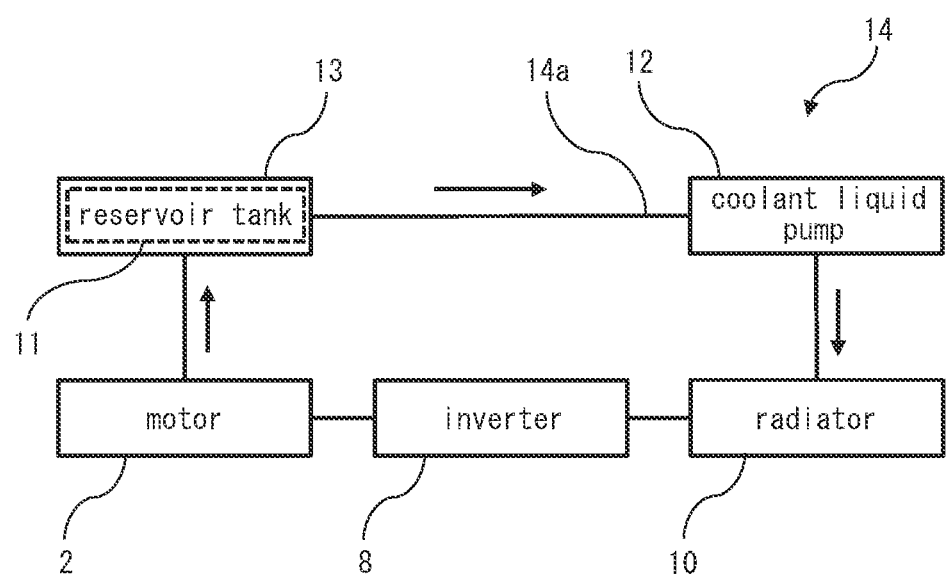
FIG. 4 shows a cooling liquid path of the electric vehicle driving device according to the first embodiment.
Figure 7:
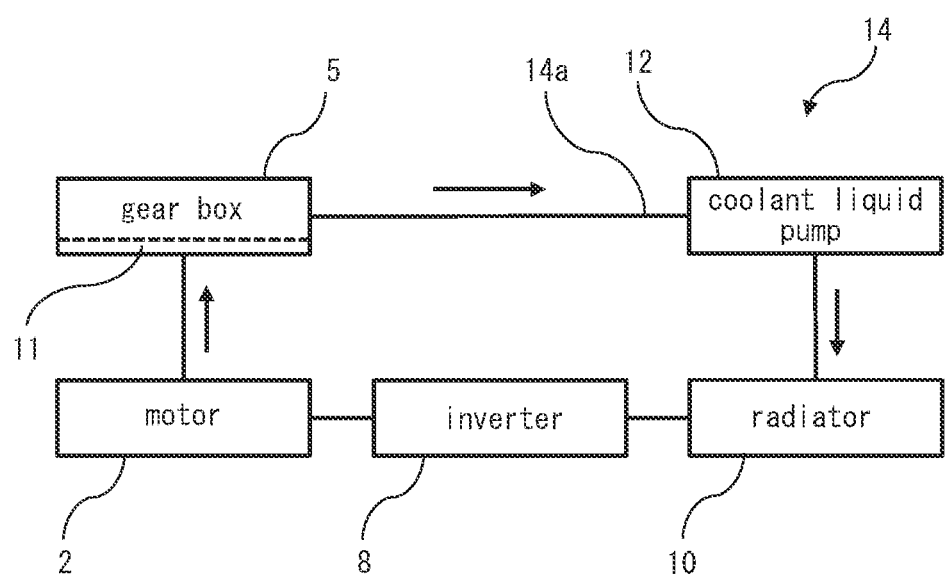
FIG. 7 shows another cooling liquid path of the electric vehicle driving device according to the first embodiment.
Figure 8:
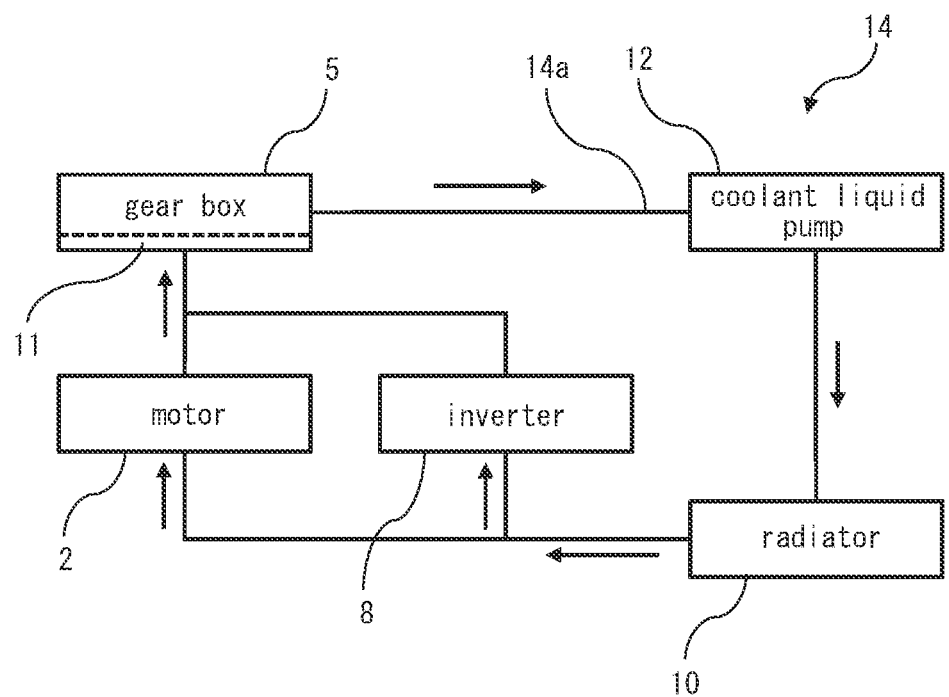
FIG. 8 shows another cooling liquid path of the electric vehicle driving device according to the first embodiment.
Figure 9:
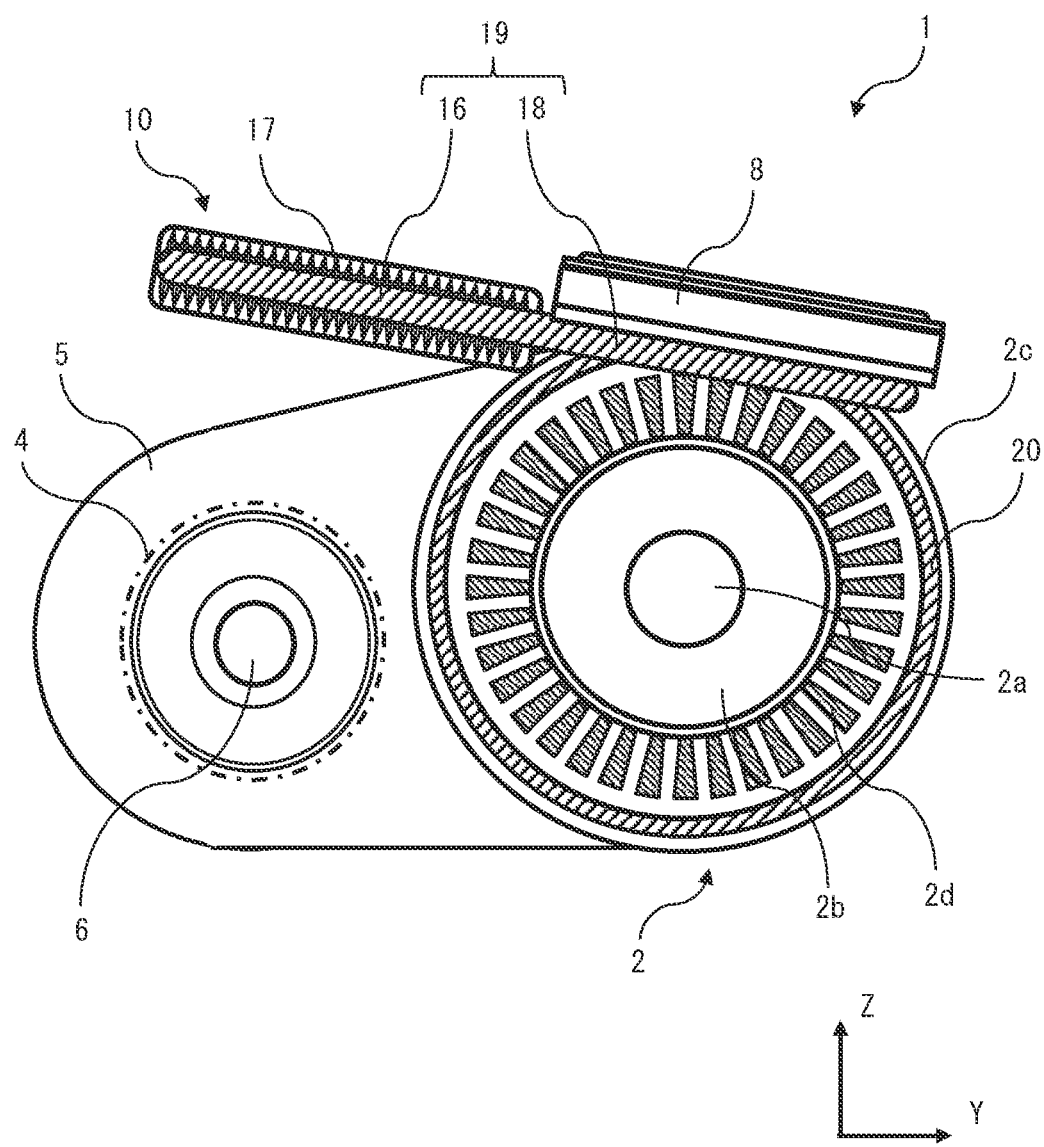
FIG. 9 is a sectional view schematically showing the electric vehicle driving device according to the first embodiment.

FIG. 1A is a plan view schematically showing an electric vehicle driving device 1 according to the first embodiment of the present disclosure. FIG. 1B is a plan view schematically showing the electric vehicle driving device 1 with a radiator 10 removed from the electric vehicle driving device 1. FIG. 2A is a front view schematically showing the electric vehicle driving device 1 as seen from the advancement direction of an electric vehicle 9. FIG. 2B is a front view schematically showing another electric vehicle driving device 1 as seen from the advancement direction of the electric vehicle 9. FIG. 3 is a side view schematically showing the electric vehicle driving device 1 as seen from another side in an X direction, and schematically shows an example of a state in which the electric vehicle driving device 1 is mounted on the front side of the electric vehicle 9 with a support structure 7 removed from the electric vehicle driving device 1. FIG. 4 shows a cooling liquid path 14 of the electric vehicle driving device 1 according to the first embodiment. FIG. 5 to FIG. 8 show other cooling liquid paths 14 of the electric vehicle driving device 1. FIG. 9 is a sectional view schematically showing the electric vehicle driving device 1 when the electric vehicle driving device 1 is cut along a YZ plane. The electric vehicle driving device 1 mounted to the electric vehicle 9 is a device that transmits rotation of a rotary shaft 2a of a motor 2 to a final gear shaft 6 via a speed reduction mechanism 3 and a differential mechanism 4.

Electric Vehicle Driving Device 1

As shown in FIG. 2A, the electric vehicle driving device 1 includes the motor 2 having the rotary shaft, a gear box 5, the final gear shaft 6, the support structure 7, and the radiator 10. The electric vehicle driving device 1 may further include an inverter 8 (not shown in FIG. 2) which is electrically connected to the motor 2 and converts power. The inverter 8 is fixed to the electric vehicle driving device 1, for example. The fixation location of the inverter 8 is not limited thereto, and the inverter 8 may be fixed to the electric vehicle 9 separately from the electric vehicle driving device 1.

As shown in FIG. 1B, the motor 2 includes a stator 2d having a core and a coil, a rotor 2b provided on the inner side of the stator 2d, and a housing 2c storing the stator 2d and the rotor 2b. The rotary shaft 2a of the rotor 2b is rotatably supported by a bearing and is provided so as to be rotatable coaxially with the stator 2d. The housing 2c is formed by casting or forging of metal such as aluminum, for example.

The gear box 5 stores the speed reduction mechanism 3 connected to the rotary shaft 2a, and the differential mechanism 4 connected to the speed reduction mechanism 3. The speed reduction mechanism 3 outputs rotation with the speed reduced from rotation of the rotary shaft 2a of the motor 2. The differential mechanism 4 absorbs a speed difference between left and right tires. The gear box 5 is formed by casting or forging of metal such as aluminum, for example.

One side of the final gear shaft 6 is connected to the differential mechanism 4. The support structure 7 rotatably supports another side of the final gear shaft 6 and is fixed to the motor 2. Tires (not shown) are attached to both sides of the final gear shaft 6 via drive shafts. A method for fixing the support structure 7 to the motor 2 is screwing, for example. The support structure 7 is formed by casting or forging of metal such as aluminum, for example. Since the housing 2c, the gear box 5, and the support structure 7 are formed using aluminum, the weights and the costs thereof can be reduced and their complicated shapes can be easily formed. In addition, forming these members from the same material leads to a measure against electric corrosion. The material of these members is not limited to aluminum and may be a resin material.

The radiator 10 cools the motor 2. Parts of the motor 2 to be cooled by the radiator 10 are a coil of the stator 2d, the rotor 2b, a magnet, and the bearing rotatably supporting the rotary shaft 2a. A part to be cooled by the radiator 10 is not limited to the motor 2 and may include a plurality of parts of heat generation portions of the electric vehicle driving device 1. The heat generation portion of the electric vehicle driving device 1 is a part that generates heat when the electric vehicle driving device 1 is driven. For example, in the speed reduction mechanism 3 and the differential mechanism 4, heat generation portions are gear-meshed portions and bearings rotatably supporting rotary shafts (gear shafts) thereof, and in the inverter 8, heat generation portions are electric and electronic components (a control board including a power semiconductor element, a capacitor, a reactor, and a mounted component), wiring such as a busbar, and wire-connection parts of the wiring. The details of the radiator 10 will be described later.

Arrangement of Members Composing Electric Vehicle Driving Device 1

Arrangement of the members composing the electric vehicle driving device 1 will be described. The motor 2 and the final gear shaft 6 are arranged so as to be opposed to each other with an interval provided therebetween. Here, directions are defined as follows. The extending direction of the final gear shaft 6 is defined as the X direction, a direction which is perpendicular to the X direction and in which the motor 2 is provided with respect to the final gear shaft 6 is defined as one side in a Y direction, and a direction perpendicular to the X direction and the Y direction is defined as a Z direction. In the drawings, a direction indicated by each arrow is one side and a direction opposite to the direction indicated by each arrow is another side.

The gear box 5 is provided on the one side in the X direction of the motor 2 and the final gear shaft 6, and the support structure 7 is provided on the other side in the X direction of the motor 2 and the final gear shaft 6. The radiator 10 is provided on any one or two direction sides of the other side in the Y direction, the one side in the Z direction, and the other side in the Z direction with respect to the final gear shaft 6. In the present embodiment, as shown in FIG. 3, the radiator 10 is provided on the one side in the Z direction with respect to the final gear shaft 6. Arrangement of the radiator 10 is not limited thereto and the radiator 10 may be provided on the other side in the Y direction or the other side in the Z direction. The number of radiators 10 is not limited to one and two radiators 10 may be provided. In a case of providing two radiators 10, for example, as shown in FIG. 2B, the two radiators 10 are provided on two direction sides, i.e., the one side in the Z direction and the other side in the Z direction with respect to the final gear shaft 6. The radiator 10 may be one radiator 10 formed in an L shape extending on the one side (or other side) in the Z direction and the other side in the Y direction with respect to the final gear shaft 6.

Since the members composing the electric vehicle driving device 1 are arranged as described above, a space around the final gear shaft 6 can be used as a space for an air passage through which air can pass, and can be effectively utilized as a space where the radiator 10 is placed. Since the air passage and the radiator 10 are provided around the final gear shaft 6, heat generated inside the electric vehicle driving device 1 can be dissipated without the need of the external-water-cooled system, whereby the electric vehicle driving device 1 can be efficiently cooled. Since the external-water-cooled system is not needed, the weight and the size of the electric vehicle driving device 1 can be reduced. Since the weight and the size of the electric vehicle driving device 1 are reduced, more batteries can be mounted in the electric vehicle 9, whereby the cruising range of the electric vehicle 9 can be increased. In addition, since the external-water-cooled system is not needed and a cooling mechanism formed by the air passage and the radiator 10 is integrated with the electric vehicle driving device 1, the electric vehicle driving device 1 can be easily mounted into the electric vehicle 9.

Configurations of Radiator 10 and Heat Dissipation

First, a configuration for heat dissipation by the radiator 10 will be described. In the present embodiment, heat dissipation is performed using a cooling liquid circulating between the radiator 10 and the heat generation portion. The cooling liquid directly or indirectly absorbs heat from the heat generation portion of the electric vehicle driving device 1. The cooling liquid whose temperature has increased through heat absorption passes through the radiator 10. When the cooling liquid passes, heat is dissipated from the cooling liquid to the air via a fixation wall for the radiator 10, through radiation and convective heat transfer to the surroundings around the radiator 10. A low-temperature cooling liquid 11 sent out from the radiator 10 is supplied to the heat generation portion again. Through such sequential actions, the heat generation portion of the electric vehicle driving device 1 can be efficiently cooled.

Next, the configuration of the radiator 10 will be described. The radiator 10 has a pipe inside which the cooling liquid can move, and a plurality of plate-shaped heat-dissipation fins densely arranged with any gaps provided therebetween along the extending direction of the pipe. Heat is transferred over the entire pipe through movement of the cooling liquid. Heat is transferred from a pipe wall of the pipe to the heat-dissipation fins through heat conduction, and heat is dissipated from the surfaces of the heat-dissipation fins to the surroundings through radiation and convective heat transfer. As a specific configuration, the radiator 10 is formed such that a plurality of heat-dissipation fins are stacked and fixed in contact with a pipe on a pipe configuration connecting two headers by a plurality of pipes, a continuous meandering pipe configuration, or a pipe structure having a plurality of heat pipes arranged in parallel, for example. The plurality of heat pipes may be arranged with gaps provided therebetween.

Cooling Liquid Path 14

Figure 5:
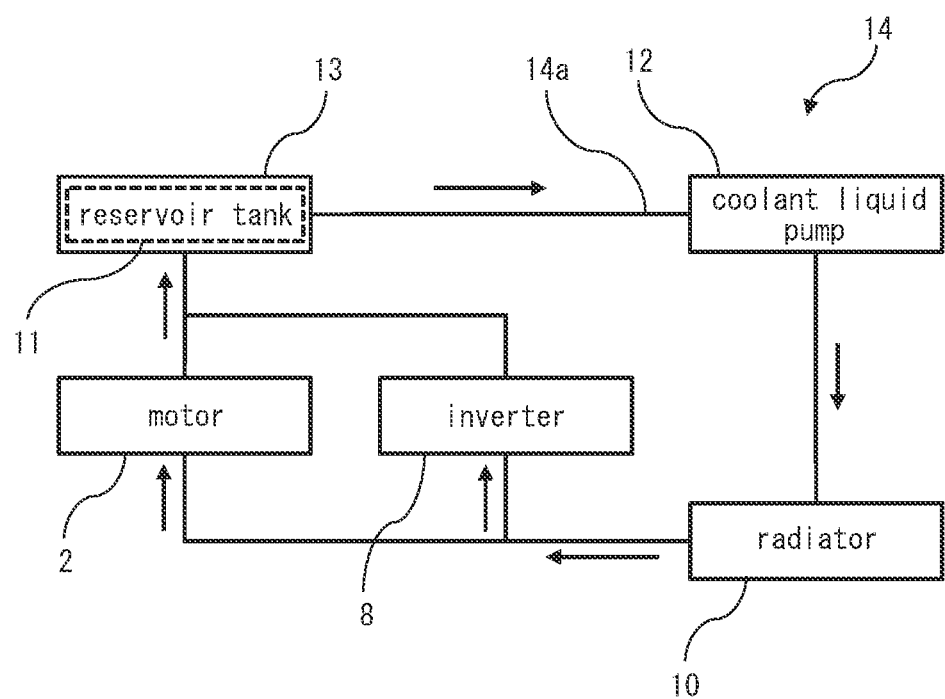
FIG. 5 shows another cooling liquid path of the electric vehicle driving device according to the first embodiment.

With reference to FIG. 4 to FIG. 8, the configuration of the cooling liquid path 14 through which the cooling liquid 11 circulates will be described. In these drawings, the cooling liquid 11 circulates in directions of arrows. First, the cooling liquid path 14 shown in FIG. 4 and FIG. 5 will be described. The radiator 10 shown in FIG. 4 and FIG. 5 is an air-cooled refrigerant cooler. The electric vehicle driving device 1 further includes a cooling liquid pump 12 and a reservoir tank 13 connected in series to the air-cooled refrigerant cooler by a pipe 14a through which the cooling liquid 11 as a refrigerant flows, and the inverter 8 which is electrically connected to the motor 2 and converts power. The cooling liquid 11 is a refrigerant such as water, brine (antifreeze), or a fluorocarbon refrigerant. The reservoir tank 13 may be an accumulator or a receiver tank. The cooling liquid path 14 is formed such that the cooling liquid 11 stored in the reservoir tank 13 circulates in order of the cooling liquid pump 12, the air-cooled refrigerant cooler, and then the reservoir tank 13. A part of the pipe 14a on the cooling liquid path 14 between the air-cooled refrigerant cooler and the reservoir tank 13 is provided in series so as to pass through the inverter 8 and the motor 2 in this order or in parallel so as to pass through the inverter 8 and the motor 2 in parallel.

In FIG. 4, the part of the pipe 14a on the cooling liquid path 14 between the air-cooled refrigerant cooler and the reservoir tank 13 is provided in series so as to pass through the inverter 8 and the motor 2 in this order. In FIG. 5, the part of the pipe 14a on the cooling liquid path 14 between the air-cooled refrigerant cooler and the reservoir tank 13 is provided in parallel so as to pass through the inverter 8 and the motor 2 in parallel. An example of cooling of the speed reduction mechanism 3 and the differential mechanism 4 will be described. The part of the pipe 14a on the cooling liquid path 14 contacts with the gear box 5 storing the speed reduction mechanism 3 and the differential mechanism 4, and cools the speed reduction mechanism 3 and the differential mechanism 4 indirectly via lubricant oil or a structure forming the gear box 5.

With this configuration, the inverter 8 is connected at a position just after the air-cooled refrigerant cooler on the cooling liquid path 14, so that the cooling liquid 11 cooled at the air-cooled refrigerant cooler passes through the inverter 8 first, whereby the inverter 8 can be most efficiently cooled. The inverter 8 has a water-cooled plate having therein a water path through which the cooling liquid 11 passes, for example. The water-cooled plate has a cooling surface on which electric and electronic components are mounted. The electric and electronic components are efficiently cooled by the cooling liquid 11. If the cooling liquid 11 is water, since water has an excellent thermal property and the number of times of heat exchange is one, the inverter 8 can be cooled by water having the lowest temperature.

Figure 6:
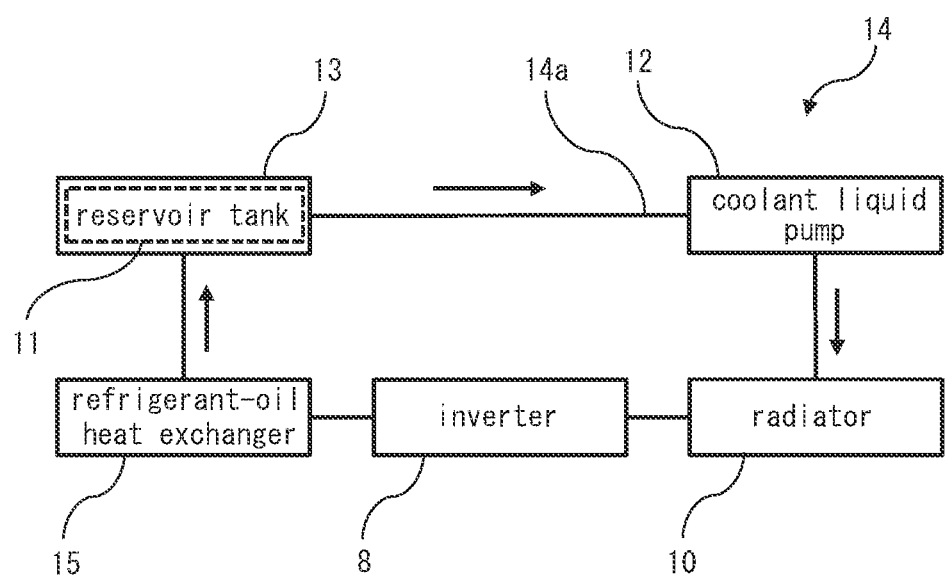
FIG. 6 shows another cooling liquid path of the electric vehicle driving device according to the first embodiment.

Next, the cooling liquid path 14 shown in FIG. 6 will be described. The radiator 10 shown in FIG. 6 is an air-cooled refrigerant cooler. The electric vehicle driving device 1 further includes the cooling liquid pump 12, the reservoir tank 13, and a refrigerant-oil heat exchanger 15 connected in series to the air-cooled refrigerant cooler by the pipe 14a through which the cooling liquid 11 as a refrigerant flows, and the inverter 8 which is electrically connected to the motor 2 and converts power. The cooling liquid 11 is a refrigerant such as water, brine (antifreeze), or a fluorocarbon refrigerant. The cooling liquid path 14 is formed such that the cooling liquid 11 stored in the reservoir tank 13 circulates in order of the cooling liquid pump 12, the air-cooled refrigerant cooler, the refrigerant-oil heat exchanger 15, and then the reservoir tank 13. A part of the pipe 14a on the cooling liquid path 14 between the air-cooled refrigerant cooler and the refrigerant-oil heat exchanger 15 is provided so as to pass through the inverter 8.

The refrigerant-oil heat exchanger 15 has a water path which is a part of the cooling liquid path 14 and an oil path which is a part of an oil-cooled system (not shown). At the refrigerant-oil heat exchanger 15, heat exchange is performed between the cooling liquid 11 and oil, so that the oil is cooled by the cooling liquid 11. The oil-cooled system is a system for circulating oil that has a lowered temperature by being cooled at the refrigerant-oil heat exchanger 15, for example. By the temperature-lowered oil circulating in the oil-cooled system, the motor 2, the speed reduction mechanism 3, and the differential mechanism 4 are cooled.

With this configuration, the inverter 8 is connected next to the air-cooled refrigerant cooler and then the refrigerant-oil heat exchanger 15 is connected next thereto, on the cooling liquid path 14, so that the cooling liquid 11 cooled at the air-cooled refrigerant cooler cools the inverter 8 first and then cools oil at the refrigerant-oil heat exchanger 15, whereby the inverter 8, the motor 2, and the gear box 5 can be cooled in a well-balanced manner. The cooled oil directly contacts with a gear and a bearing inside the gear box 5, and a coil end, a bearing, and the like in the motor, and thus can efficiently cool these. Since heat exchange is performed twice, i.e., from air to water and from water to oil, the oil temperature becomes high, but since parts are lubricated with the oil which is not corrosive, gaps and protrusions present at the gear, the bearing, and the coil end can be directly cooled by the oil. Since the gaps and the protrusions are directly cooled, the gear, the bearing, and the coil end can be efficiently cooled.

Next, the cooling liquid path 14 shown in FIG. 7 and FIG. 8 will be described. The radiator 10 shown in FIG. 7 and FIG. 8 is an air-cooled oil cooler. The electric vehicle driving device 1 further includes the cooling liquid pump 12 connected in series to the air-cooled oil cooler by the pipe 14a through which the cooling liquid 11 as a refrigerant flows, and the inverter 8 which is electrically connected to the motor 2 and converts power. The cooling liquid 11 is oil. The cooling liquid pump 12 is provided to the gear box 5, and the cooling liquid path 14 is formed such that the cooling liquid 11 accumulated at the bottom of the gear box 5 circulates in order of the cooling liquid pump 12, the air-cooled oil cooler, and then the gear box 5. A part of the pipe 14a on the cooling liquid path 14 between the air-cooled oil cooler and the gear box 5 is provided in series so as to pass through the inverter 8 and the motor 2 in this order or in parallel so as to pass through the inverter 8 and the motor 2 in parallel.

In FIG. 7, the part of the pipe 14a on the cooling liquid path 14 between the air-cooled oil cooler and the gear box 5 is provided in series so as to pass through the inverter 8 and the motor 2 in this order. In FIG. 8, the part of the pipe 14a on the cooling liquid path 14 between the air-cooled oil cooler and the gear box 5 is provided in parallel so as to pass through the inverter 8 and the motor 2 in parallel. From the part of the pipe 14a on the cooling liquid path 14, the oil is supplied to rotary shaft support structures and gear contact portions of the speed reduction mechanism 3 and the differential mechanism 4 in the gear box 5, whereby the speed reduction mechanism 3 and the differential mechanism 4 are cooled.

With this configuration, the inverter 8 and the motor 2 are connected next to the air-cooled oil cooler and then the gear box 5 is connected next thereto, on the cooling liquid path 14, so that the cooling liquid 11 cooled at the air-cooled oil cooler directly cools the gear, the bearing, the coil end, and the like inside the motor 2 together with the inverter 8 first and then cools the inside of the gear box 5, whereby the motor 2 and the gear box 5 can be most efficiently cooled. The inverter 8 has an oil-cooled plate having therein an oil path through which the cooling liquid 11 passes, for example. The oil-cooled plate has a cooling surface on which electric and electronic components are mounted. The electric and electronic components are efficiently cooled by the cooling liquid 11. Although the thermal property of the oil is inferior to that of water, since the number of times of heat exchange is one, the temperature of the oil is lowest and the motor 2 can be efficiently cooled.

As necessary, a strainer for collecting trash inside the cooling liquid path 14, a flow divider for performing distribution amount adjustment and distribution amount switching of the cooling liquid 11, and an additional flow path for the cooling liquid to lubricate another heat generation portion, may be provided at a certain part on the cooling liquid path 14.

Configuration Example of Electric Vehicle Driving Device 1

With reference to FIG. 9, a configuration example of the electric vehicle driving device 1 will be described. The electric vehicle driving device 1 further includes a plurality of heat pipes 19 each having a heat dissipation portion 16 on one side and a heat reception portion 18 on another side, and the inverter 8 which is electrically connected to the motor 2 and converts power. The radiator 10 is the heat dissipation portions 16 each having a plurality of heat pipe heat-dissipation fins 17. The heat reception portions 18 are thermally connected to either or both of the motor 2 and the inverter 8. In the present embodiment, the heat reception portions 18 are thermally connected to both of the motor 2 and the inverter 8. The radiator 10 is provided on the one side in the Z direction with respect to the final gear shaft 6. The plurality of heat pipes 19 are provided side by side in the X direction with gaps provided therebetween, for example. The X direction is perpendicular to the drawing sheet.

With this configuration, since the radiator 10 is parts of the plurality of heat pipes 19, heat generated inside the electric vehicle driving device 1 can be dissipated without the need of the external-water-cooled system, whereby the electric vehicle driving device 1 can be efficiently cooled. Since the external-water-cooled system is not needed, the weight and the size of the electric vehicle driving device 1 can be reduced. Since the weight and the size of the electric vehicle driving device 1 are reduced, more batteries can be mounted in the electric vehicle 9, whereby the cruising range of the electric vehicle 9 can be increased. In addition, since the external-water-cooled system is not needed and the inverter 8 and a cooling mechanism formed by the air passage and the radiator 10 are integrated with the electric vehicle driving device 1, the electric vehicle driving device 1 can be easily mounted into the electric vehicle 9.

The inverter 8 is thermally connected to the one side in the Z direction of the heat reception portions 18 of the heat pipes 19, and the motor 2 is thermally connected to the other side in the Z direction of the heat reception portions 18 of the heat pipes 19. The heat reception portions 18 of the heat pipes 19 are interposed between the motor 2 and the inverter 8. Arrangement of the inverter 8 and the heat pipes 19 is not limited thereto and the heat pipes 19 may be provided on the other side in the Z direction with respect to the final gear shaft 6 and the motor 2. In a case where the heat pipes 19 are provided on the other side in the Z direction with respect to the final gear shaft 6 and the motor 2, the inverter 8 is thermally connected to the other side in the Z direction of the heat reception portions 18 of the heat pipes 19, for example, and the motor 2 is thermally connected to the one side in the Z direction of the heat reception portions 18 of the heat pipes 19.

In the configuration shown in FIG. 9, in order to ensure contact with the heat pipes 19 without gaps, a plurality of grooves for respectively contacting with the outer peripheral surfaces of the heat pipes 19 may be provided on the other side in the Z direction of the inverter 8 and the one side in the Z direction of the motor 2. Instead of providing grooves on the inverter 8 and the motor 2, heat reception portion plates which are additional members may be provided between the inverter 8 and the heat pipes 19 and between the motor 2 and the heat pipes 19, and the outer peripheral surfaces of the heat pipes 19 may respectively contact with a plurality of grooves provided on the heat reception portion plates. A heat reception portion plate having through holes may be provided, the heat pipes 19 may be respectively inserted into the through holes, and the heat reception portion plate including the heat pipes 19 may be interposed between the inverter 8 and the motor 2.

In addition to the heat pipe 19, an additional heat pipe 20 may be provided. The additional heat pipe 20 is provided in contact with the housing 2c storing the motor 2. With this configuration, the temperature of the motor 2 can be uniformed over the entire circumference thereof, and heat of the motor 2 can be efficiently transferred to the heat reception portion 18 part of the heat pipe 19 contacting with the motor 2. Since heat of the motor 2 is efficiently transferred, the motor 2 can be more cooled.

As shown in FIG. 9, in a case where the center part of the additional heat pipe 20 is located on the other side in the Z direction of the motor 2, flow of the cooling liquid arises on both sides in the Y direction in the additional heat pipe 20, whereby heat can be transferred on both sides in the Y direction. Since heat can be transferred on both sides in the Y direction, the additional heat pipe 20 can more efficiently transfer heat. In a case where the additional heat pipes 20 provided to the housing 2c and the heat reception portions 18 of the heat pipes 19 are arranged alternately in the X direction, the Z-direction height of the part where the heat pipes 19 and the additional heat pipes 20 are provided in the X direction can be reduced, whereby the size of the electric vehicle driving device 1 can be reduced.

As described above, in the electric vehicle driving device 1 according to the first embodiment, the motor 2 and the final gear shaft 6 are arranged so as to be opposed to each other with an interval provided therebetween. The gear box 5 is provided on the one side in the X direction of the motor 2 and the final gear shaft 6, and the support structure 7 is provided on the other side in the X direction of the motor 2 and the final gear shaft 6. The radiator 10 is provided on any one or two direction sides of the other side in the Y direction, the one side in the Z direction, and the other side in the Z direction with respect to the final gear shaft 6. Thus, the air passage and the radiator 10 are provided around the final gear shaft 6, and heat generated inside the electric vehicle driving device 1 can be dissipated without the need of the external-water-cooled system, whereby the electric vehicle driving device 1 can be efficiently cooled. Since the external-water-cooled system is not needed, the weight and the size of the electric vehicle driving device 1 can be reduced. Since the weight and the size of the electric vehicle driving device 1 are reduced, more batteries can be mounted in the electric vehicle 9, whereby the cruising range of the electric vehicle 9 can be increased. In addition, since the external-water-cooled system is not needed and a cooling mechanism formed by the air passage and the radiator 10 is integrated with the electric vehicle driving device 1, the electric vehicle driving device 1 can be easily mounted into the electric vehicle 9.

The radiator 10 may be an air-cooled refrigerant cooler, the electric vehicle driving device 1 may further include the cooling liquid pump 12 and the reservoir tank 13 connected in series to the air-cooled refrigerant cooler by the pipe 14a through which the cooling liquid 11 as a refrigerant flows, and the inverter 8, the cooling liquid path 14 may be formed such that the cooling liquid 11 stored in the reservoir tank 13 circulates in order of the cooling liquid pump 12, the air-cooled refrigerant cooler, and then the reservoir tank 13, and the part of the pipe 14a on the cooling liquid path 14 between the air-cooled refrigerant cooler and the reservoir tank 13 is provided in series so as to pass through the inverter 8 and the motor 2 in this order or in parallel so as to pass through the inverter 8 and the motor 2 in parallel. Thus, the inverter 8 is connected at a position just after the air-cooled refrigerant cooler on the cooling liquid path 14, so that the cooling liquid 11 cooled at the air-cooled refrigerant cooler passes through the inverter 8 first, whereby the inverter 8 can be most efficiently cooled. In addition, if the cooling liquid 11 is water, since water has an excellent thermal property and the number of times of heat exchange is one, the inverter 8 can be cooled by water having the lowest temperature.

The radiator 10 may be an air-cooled refrigerant cooler, the electric vehicle driving device 1 may further include the cooling liquid pump 12, the reservoir tank 13, and the refrigerant-oil heat exchanger 15 connected in series to the air-cooled refrigerant cooler by the pipe 14a through which the cooling liquid 11 as a refrigerant flows, and the inverter 8, the cooling liquid path 14 may be formed such that the cooling liquid 11 stored in the reservoir tank 13 circulates in order of the cooling liquid pump 12, the air-cooled refrigerant cooler, the refrigerant-oil heat exchanger 15, and then the reservoir tank 13, and the part of the pipe 14a on the cooling liquid path 14 between the air-cooled refrigerant cooler and the refrigerant-oil heat exchanger 15 is provided so as to pass through the inverter. Thus, the inverter 8 is connected next to the air-cooled refrigerant cooler and then the refrigerant-oil heat exchanger 15 is connected next thereto, on the cooling liquid path 14, so that the cooling liquid 11 cooled at the air-cooled refrigerant cooler cools the inverter 8 first and then cools oil at the refrigerant-oil heat exchanger 15, whereby the inverter 8, the motor 2, and the gear box 5 can be cooled in a well-balanced manner. In addition, the cooled oil directly contacts with the gear and the bearing inside the gear box 5, and the coil end, the bearing, and the like in the motor, and thus can efficiently cool these.

The radiator 10 may be an air-cooled oil cooler, the electric vehicle driving device 1 may further include the cooling liquid pump 12 connected in series to the air-cooled oil cooler by the pipe 14a through which the cooling liquid 11 as a refrigerant flows, and the inverter 8, the cooling liquid pump 12 may be provided to the gear box 5, the cooling liquid path 14 may be formed such that the cooling liquid 11 accumulated at the bottom of the gear box 5 circulates in order of the cooling liquid pump 12, the air-cooled oil cooler, and then the gear box 5, and the part of the pipe 14a on the cooling liquid path 14 between the air-cooled oil cooler and the gear box 5 may be provided in series so as to pass through the inverter 8 and the motor 2 in this order or in parallel so as to pass through the inverter 8 and the motor 2 in parallel. Thus, the inverter 8 and the motor 2 are connected next to the air-cooled oil cooler and then the gear box 5 is connected next thereto, on the cooling liquid path 14, so that the cooling liquid 11 cooled at the air-cooled oil cooler directly cools the gear, the bearing, the coil end, and the like inside the motor 2 together with the inverter 8 first and then cools the inside of the gear box 5, whereby the motor 2 and the gear box 5 can be most efficiently cooled. In addition, although the thermal property of the oil is inferior to that of water, since the number of times of heat exchange is one, the temperature of the oil is lowest and the motor 2 can be efficiently cooled.

The electric vehicle driving device 1 may further include the plurality of heat pipes 19 each having the heat dissipation portion 16 on one side and the heat reception portion 18 on another side, and the inverter 8, the radiator 10 may be the heat dissipation portions 16 each having the plurality of heat pipe heat-dissipation fins 17, and the heat reception portions 18 may be thermally connected to either or both of the motor 2 and the inverter 8. Thus, since the radiator 10 are parts of the plurality of heat pipes 19, heat generated inside the electric vehicle driving device 1 can be dissipated without the need of the external-water-cooled system, whereby the electric vehicle driving device 1 can be efficiently cooled. Since the external-water-cooled system is not needed, the weight and the size of the electric vehicle driving device 1 can be reduced. Since the weight and the size of the electric vehicle driving device 1 are reduced, more batteries can be mounted in the electric vehicle 9, whereby the cruising range of the electric vehicle 9 can be increased. In addition, since the external-water-cooled system is not needed and the inverter 8 and a cooling mechanism formed by the air passage and the radiator 10 are integrated with the electric vehicle driving device 1, the electric vehicle driving device 1 can be easily mounted into the electric vehicle 9.

Second Embodiment

Figure 10:
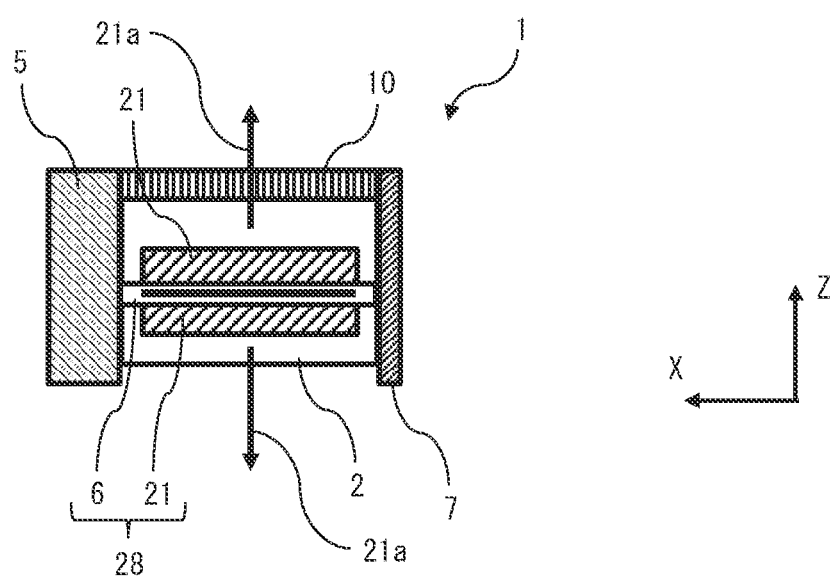
FIG. 10 is a front view schematically showing an electric vehicle driving device according to the second embodiment of the present disclosure.
Figure 11:
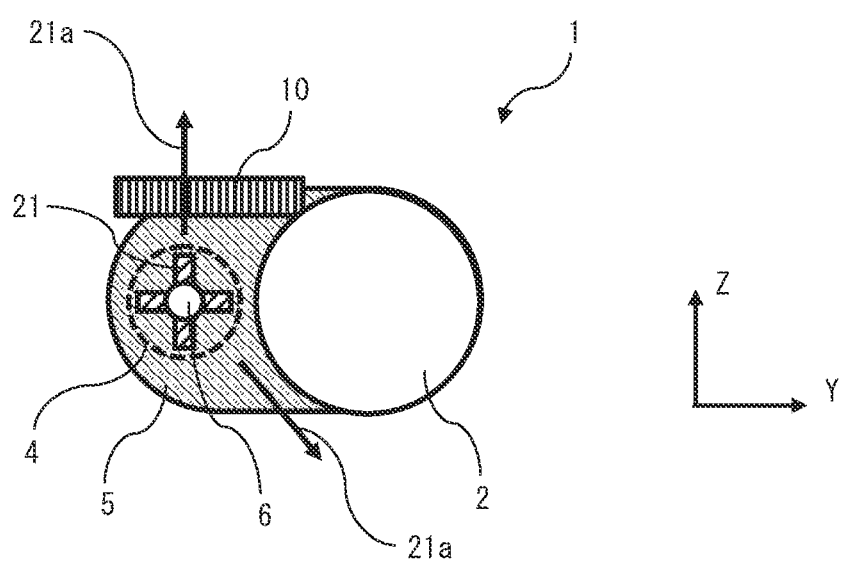
FIG. 11 is a side view schematically showing the electric vehicle driving device according to the second embodiment.

An electric vehicle driving device 1 according to the second embodiment of the present disclosure will be described. FIG. 10 is a front view schematically showing the electric vehicle driving device 1 according to the second embodiment as seen from the advancement direction of the electric vehicle. FIG. 11 is a side view schematically showing the electric vehicle driving device 1 and shows the other side in the X direction with the support structure 7 removed from the electric vehicle driving device 1. In the electric vehicle driving device 1 according to the second embodiment, the final gear shaft 6 has an impeller 21.

The configuration of the final gear shaft 6 provided with the impeller 21 in the present embodiment will be described. The final gear shaft 6 has the impeller 21 which rotates integrally with the final gear shaft 6. A driving shaft of the impeller 21 is the final gear shaft 6. As shown in FIG. 10, the final gear shaft 6 is provided so as to extend in the X direction between the gear box 5 and the support structure 7, as in the first embodiment. Each end of the final gear shaft 6 is rotatably attached to the gear box 5 or the support structure 7. The motor 2 and the radiator 10 are each fixed to the gear box 5 and the support structure 7. As shown in FIG. 11, the motor 2 is provided on the one side in the Y direction with respect to the final gear shaft 6, and the radiator 10 is provided on the one side in the Z direction with respect to the final gear shaft 6. The final gear shaft 6 is located with any intervals provided from the radiator 10 and the motor 2, and there is a space around the final gear shaft 6. The impeller 21 having such a size that can be stored in this space is fixed to the final gear shaft 6.

In the present embodiment, the impeller 21 with four plate-shaped blades is fixed in contact with the final gear shaft 6. The number of blades, the shape, and the arrangement of the impeller 21 are not limited thereto. For example, the configuration may be made such that the impeller 21 does not directly contact with the final gear shaft 6, an outer frame portion surrounding the impeller 21 and fixed to the impeller 21 contacts with the final gear shaft 6, and the impeller 21 rotates integrally with the final gear shaft 6 together with the outer frame portion. The final gear shaft 6 having the impeller 21 which rotates integrally with the final gear shaft 6 forms a fan 28, as shown in FIG. 10.

Since each end of the final gear shaft 6 is supported by the gear box 5 or the support structure 7, and the final gear shaft 6 and the motor 2 are arranged in parallel, the distance between the final gear shaft 6 and the motor 2 is always constant. Therefore, when the blade of the impeller 21 is located on the motor 2 side during rotation, the Y-direction distance between the motor 2 and the blade end of the impeller 21 on the side opposite to the side attached to the final gear shaft 6 is always constant, and thus the impeller 21 and the motor 2 do not interfere with each other. Similarly, the Z-direction distance between the radiator 10 and the blade end of the impeller 21 on the side opposite to the side attached to the final gear shaft 6 is always constant, and thus the impeller 21 and the radiator 10 do not interfere with each other.

In the present embodiment, rotation of the motor 2 is transmitted to the final gear shaft 6 via the speed reduction mechanism 3 and the differential mechanism 4, and the impeller 21 fixed to the final gear shaft 6 rotates integrally with the final gear shaft 6. Through rotation of the impeller 21, airflows 21a are produced around the final gear shaft 6. In the drawings, the flowing directions of the airflows 21a are indicated by arrows. The airflow 21a passes through the radiator 10 located adjacently to the impeller 21. In addition, the airflow 21a flows along the outer surface of the motor 2 located adjacently to the impeller 21. The radiator 10 and the motor 2 are forcibly air-cooled by the airflows 21a, whereby the electric vehicle driving device 1 can be more efficiently cooled as compared to the first embodiment.

In general, the maximum rotational speed of the motor 2 used in an electric vehicle is not less than 18,000 rpm and thus the motor 2 rotates at a high speed. In a case where the impeller 21 is provided to the rotary shaft 2a of the motor 2, it is necessary to use a fan reinforced to have a great strength, so that the fan becomes expensive and increases in size, thus having a problem that the electric vehicle driving device 1 is not reduced in weight and increases in size. In addition, since the impeller 21 rotates at a high speed, there is a problem that noise due to rotation of the impeller 21 is significantly great. A reduction ratio in the speed reduction mechanism 3 and the differential mechanism 4, which is a rotational speed ratio between the motor 2 and the final gear shaft 6, is about 10, and therefore the rotational speed of the final gear shaft 6 is about 2,000 rpm. Since the final gear shaft 6 has the impeller 21, the impeller 21 need not be reinforced in particular, and noise does not become significantly great.

In addition, since heat of the radiator 10 and the motor 2 is dissipated using the airflow 21a artificially produced by the impeller 21, the influence of the driving state (speed, zigzag traveling, etc.) and the surrounding environment (weather, speed and direction of surrounding wind, conditions regarding surrounding vehicles (distances and relative speeds), etc.) is small. Since the influence of the driving state and the surrounding environment is small, low-temperature air can be stably and sufficiently supplied to the radiator 10 and the motor 2.

As described above, in the electric vehicle driving device 1 according to the second embodiment, the final gear shaft 6 has the impeller 21 which rotates integrally with the final gear shaft 6. Thus, without increase in the volume of the electric vehicle driving device 1, the space around the final gear shaft 6 is effectively utilized and low-temperature air can be stably and sufficiently supplied to the radiator 10 with less noise, whereby the electric vehicle driving device 1 can be more efficiently cooled.

Third Embodiment

Figure 12:
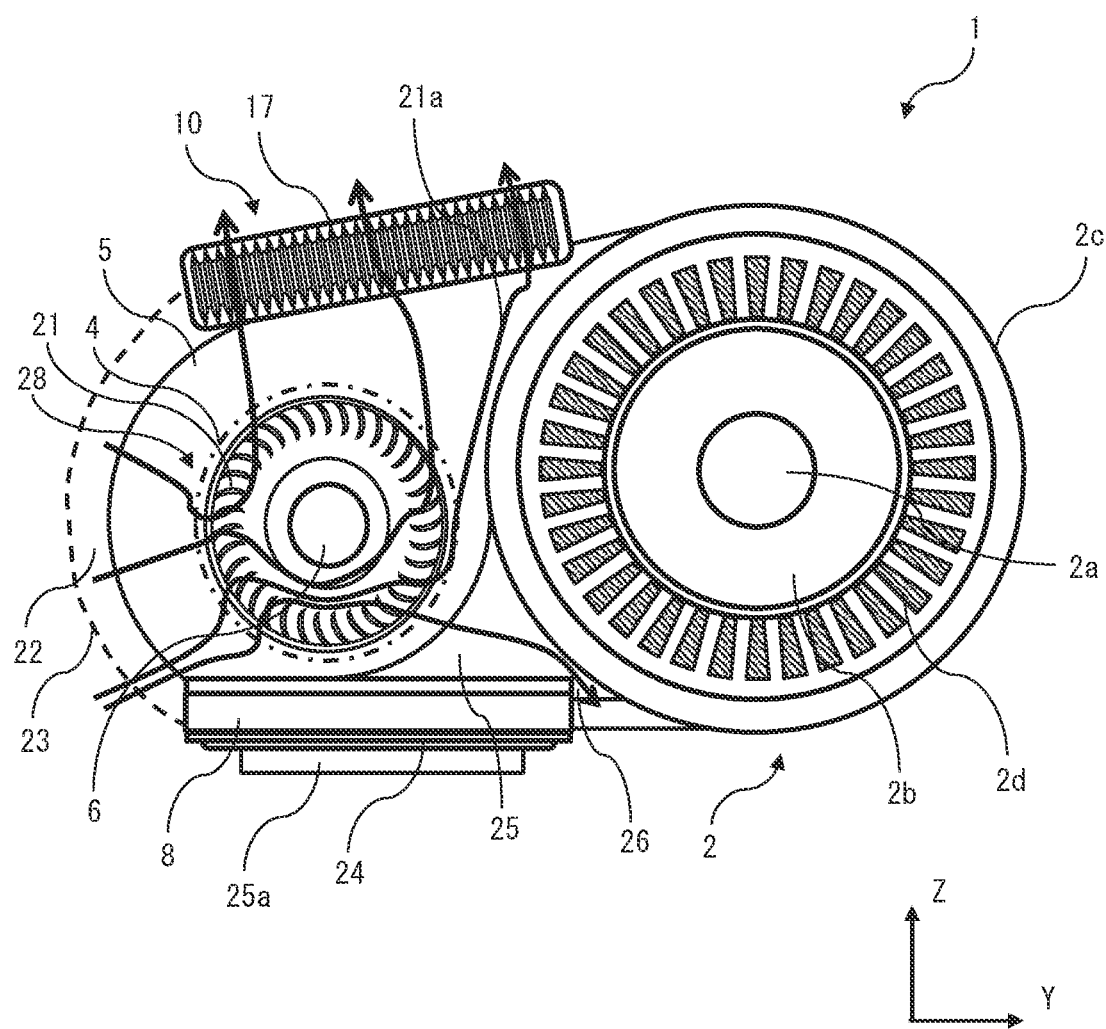
FIG. 12 is a sectional view schematically showing an electric vehicle driving device according to the third embodiment of the present disclosure.

An electric vehicle driving device 1 according to the third embodiment of the present disclosure will be described. FIG. 12 is a sectional view schematically showing the electric vehicle driving device 1 according to the third embodiment when cut along a YZ plane. In the electric vehicle driving device 1 according to the third embodiment, the inverter 8 is provided at a part around the final gear shaft 6.

The configuration in which the inverter 8 is provided at a part around the final gear shaft 6 in the present embodiment will be described. The electric vehicle driving device 1 further includes the inverter 8 which is electrically connected to the motor 2 and converts power. The radiator 10 is provided on any one direction side of the other side in the Y direction, the one side in the Z direction, and the other side in the Z direction with respect to the final gear shaft 6, and the inverter 8 is provided on a side where the radiator 10 is not provided and which is any one direction side of the other side in the Y direction, the one side in the Z direction, and the other side in the Z direction with respect to the final gear shaft 6. In the present embodiment, the inverter 8 is provided on the other side in the Z direction with respect to the final gear shaft 6, and the radiator 10 is provided on the one side in the Z direction with respect to the final gear shaft 6.

Arrangement of the inverter 8 and the radiator 10 is not limited thereto. The inverter 8 may be provided on the one side in the Z direction with respect to the final gear shaft 6, and the radiator 10 may be provided on the other side in the Z direction with respect to the final gear shaft 6. In addition, one of the inverter 8 and the radiator 10 may be provided on the other side in the Y direction with respect to the final gear shaft 6.

With this configuration, flow of air can be blocked on the side where the inverter 8 is provided, and suction of air can be suppressed on the side where the radiator 10 is provided. Thus, the inverter 8 and the radiator 10 can be used as parts of an air passage for adjusting flow of air, and the remaining one side where the inverter 8 and the radiator 10 are not provided can be formed as an opening surface 22 through which air is supplied to the impeller 21. The opening surface 22 is an air-suction surface for sucking low-temperature air around the electric vehicle driving device 1. An air passage is formed by the inverter 8, the motor 2, the gear box 5, and the support structure 7, and air flowing inward through the opening surface 22 passes through the impeller 21 and then the radiator 10, whereby the unidirectional airflow 21a can be formed. Since the unidirectional airflow 21a is formed, low-temperature air is stably supplied to the radiator 10, whereby the electric vehicle driving device 1 can be more efficiently cooled. In the configuration shown in the second embodiment, the remaining two sides where the radiator 10 is not provided contribute to both of air suction and air discharge, and a unidirectional airflow is not formed. Thus, the air around the final gear shaft 6 is disturbed and therefore the electric vehicle driving device 1 cannot be sufficiently and efficiently cooled.

In the present embodiment, the electric vehicle driving device 1 further includes a cover 23 provided at an opening surface 22 which is a side where the radiator 10 and the inverter 8 are not provided and which is any one direction side of the other side in the Y direction, the one side in the Z direction, and the other side in the Z direction with respect to the final gear shaft 6, the cover 23 having an air-passage opening through which air flows inward. The cover 23 prevents entry of a flying stone which can cause damage to the impeller 21 and the radiator 10, and inhibits the radiator 10 from being clogged with trash. The cover 23 is a filter, a wire mesh, punched metal, or a louver-equipped plate, for example. By providing the cover 23, damage to the impeller 21 and the radiator 10 due to entry of a flying stone is prevented and stable air suction into the electric vehicle driving device 1 is ensured, whereby the electric vehicle driving device 1 can be maintained in a well-cooled state.

In the present embodiment, the Z direction is a vertical direction, the one side in the Z direction is defined as a vertically upper side, and the other side in the Z direction is defined as a vertically lower side. The inverter 8 is provided on the other side in the Z direction with respect to the final gear shaft 6, and the inverter 8 has an attachable/detachable lid 24 on the other side in the Z direction. The other side in the Z direction of the inverter 8 when the lid 24 is detached serves as a maintenance work surface for the inverter 8. In a case where the inverter 8 is provided on the one side in the Z direction with respect to the final gear shaft 6 or the one side in the Z direction of the motor 2, when the inverter 8 has failed, the electric vehicle driving device 1 itself needs to be taken off the electric vehicle 9, to perform maintenance for the inverter 8. The inverter 8 is provided on the other side in the Z direction with respect to the final gear shaft 6, and the inverter 8 has the attachable/detachable lid 24 on the other side in the Z direction. Thus, without taking off the electric vehicle driving device 1 itself, the lid 24 of the inverter 8 can be detached from the vertically lower side of the electric vehicle 9 and maintenance work for the inverter 8 can be easily performed.

In the present embodiment, either or both of the motor 2 and the inverter 8 have a plurality of heat-dissipation fins 25 at parts on the final gear shaft 6 side. In the configuration shown in FIG. 12, both of the motor 2 and the inverter 8 have a plurality of heat-dissipation fins 25. The plurality of heat-dissipation fins 25 are formed side by side in the X direction in an air passage formed by the inverter 8, the motor 2, the gear box 5, and the support structure 7. With this configuration, in addition to heat dissipation through the radiator 10, the electric vehicle driving device 1 can dissipate heat also through the heat-dissipation fins 25 with low-temperature air flowing inward through the opening surface 22 and passing through the air passage. Since the electric vehicle driving device 1 dissipates heat also through the heat-dissipation fins 25, the electric vehicle driving device 1 can be more efficiently cooled.

The location where the heat-dissipation fins 25 are provided is not limited to the above location. In the present embodiment, the inverter 8 has a plurality of heat-dissipation fins 25a at the lid 24 which is a part on the side opposite to the final gear shaft 6 side. The plurality of heat-dissipation fins 25a are formed in plate shapes and are provided side by side in the X direction, for example. With this configuration, the inverter 8 is cooled by traveling wind passing on the other side in the Z direction of the inverter 8, whereby the electric vehicle driving device 1 can be more efficiently cooled.

In the present embodiment, the inverter 8 is provided on the one side in the Z direction or the other side in the Z direction with respect to the final gear shaft 6, and the motor 2 and the inverter 8 are located with a gap provided therebetween. In the configuration shown in FIG. 12, the inverter 8 is provided on the other side in the Z direction with respect to the final gear shaft 6, and a gap 26 is provided between the motor 2 and the inverter 8. With this configuration, air flowing into the air passage can flow out through the gap 26, so that air passes to a part adjacent to the gap 26 part and located on the contact side of the heat-dissipation fins 25 contacting with the motor 2 or the inverter 8, whereby the electric vehicle driving device 1 can be more efficiently cooled.

As described above, in the electric vehicle driving device 1 according to the third embodiment, the radiator 10 is provided on any one direction side of the other side in the Y direction, the one side in the Z direction, and the other side in the Z direction with respect to the final gear shaft 6, and the inverter 8 is provided on a side where the radiator 10 is not provided and which is any one direction side of the other side in the Y direction, the one side in the Z direction, and the other side in the Z direction with respect to the final gear shaft 6. Thus, an air passage is formed by the inverter 8, the motor 2, the gear box 5, and the support structure 7, and air flowing inward through the opening surface 22 passes through the impeller 21 and then the radiator 10, whereby the unidirectional airflow 21a can be formed. Since the unidirectional airflow 21a is formed, low-temperature air is stably supplied to the radiator 10, whereby the electric vehicle driving device 1 can be more efficiently cooled.

The inverter 8 may be provided on the other side in the Z direction with respect to the final gear shaft 6, and the inverter 8 may have the attachable/detachable lid 24 on the other side in the Z direction. Thus, without taking the electric vehicle driving device 1 itself off the electric vehicle 9, the lid 24 of the inverter 8 can be detached from the vertically lower side of the electric vehicle 9 and maintenance work for the inverter 8 can be easily performed. The electric vehicle driving device 1 may further include the cover 23 provided at the opening surface 22 which is a side where the radiator 10 and the inverter 8 are not provided and which is any one direction side of the other side in the Y direction, the one side in the Z direction, and the other side in the Z direction with respect to the final gear shaft 6, the cover 23 having an air-passage opening through which air flows inward. Thus, damage to the impeller 21 and the radiator 10 due to entry of a flying stone is prevented and stable air suction into the electric vehicle driving device 1 is ensured, whereby the electric vehicle driving device 1 can be maintained in a well-cooled state.

Either or both of the motor 2 and the inverter 8 may have the plurality of heat-dissipation fins 25 at parts on the final gear shaft 6 side. Thus, in addition to heat dissipation through the radiator 10, the electric vehicle driving device 1 can dissipate heat also through the heat-dissipation fins 25 with low-temperature air flowing inward through the opening surface 22 and passing through the air passage, whereby the electric vehicle driving device 1 can be more efficiently cooled. The inverter 8 may be provided on the one side in the Z direction or the other side in the Z direction with respect to the final gear shaft 6, and the motor 2 and the inverter 8 may be located with the gap 26 provided therebetween. Thus, air flowing into the air passage can flow out through the gap 26, so that air passes to a part adjacent to the gap 26 part and located on the contact side of the heat-dissipation fin 25 contacting with the motor 2 or the inverter 8, whereby the electric vehicle driving device 1 can be more efficiently cooled. The inverter 8 may have the plurality of heat-dissipation fins 25a at the lid 24 which is a part on the side opposite to the final gear shaft 6 side. Thus, the inverter 8 is cooled by traveling wind passing on the other side in the Z direction of the inverter 8, whereby the electric vehicle driving device 1 can be more efficiently cooled.

Fourth Embodiment

Figure 13:
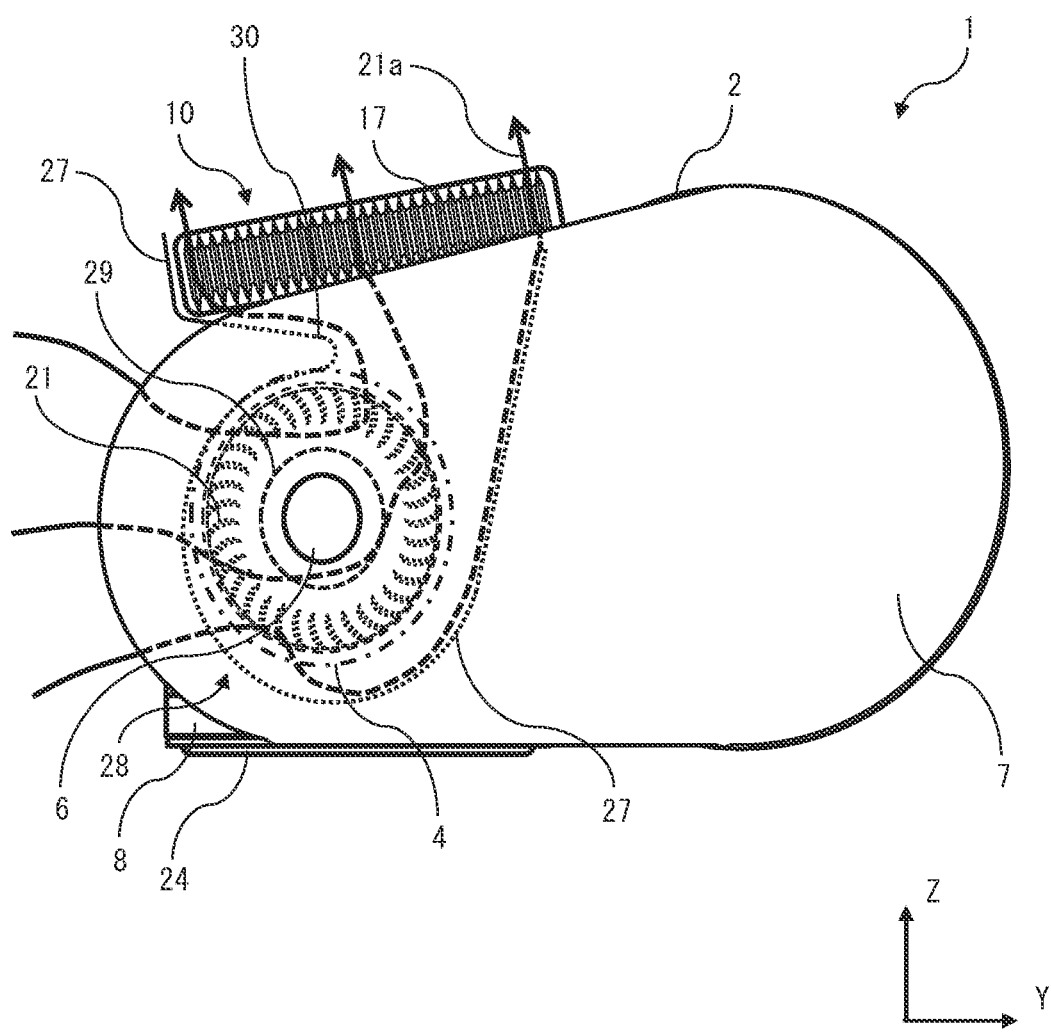
FIG. 13 is a side view schematically showing an electric vehicle driving device according to the fourth embodiment of the present disclosure.
Figure 14:
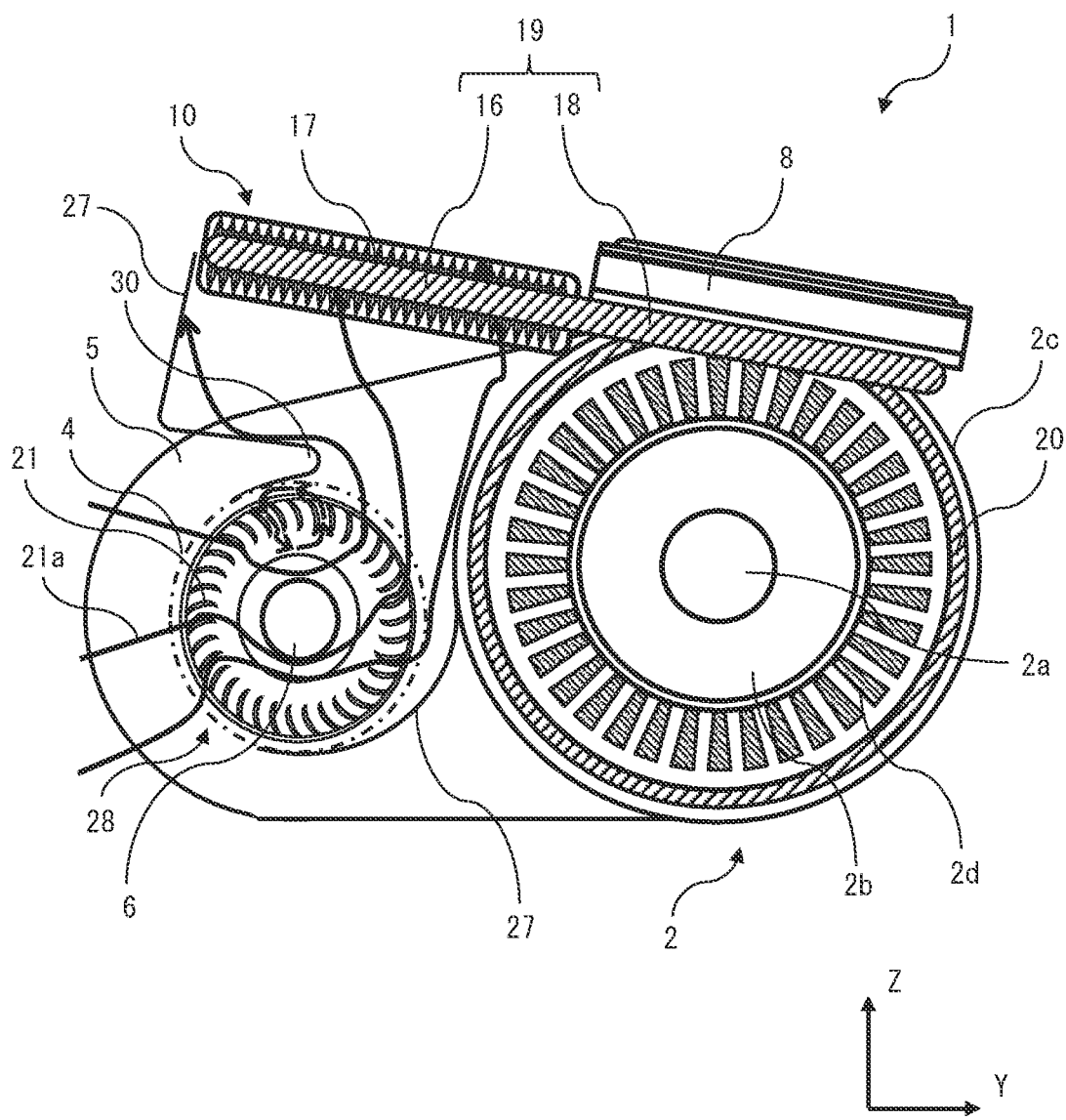
FIG. 14 is a sectional view schematically showing the electric vehicle driving device according to the fourth embodiment.
Figure 15:
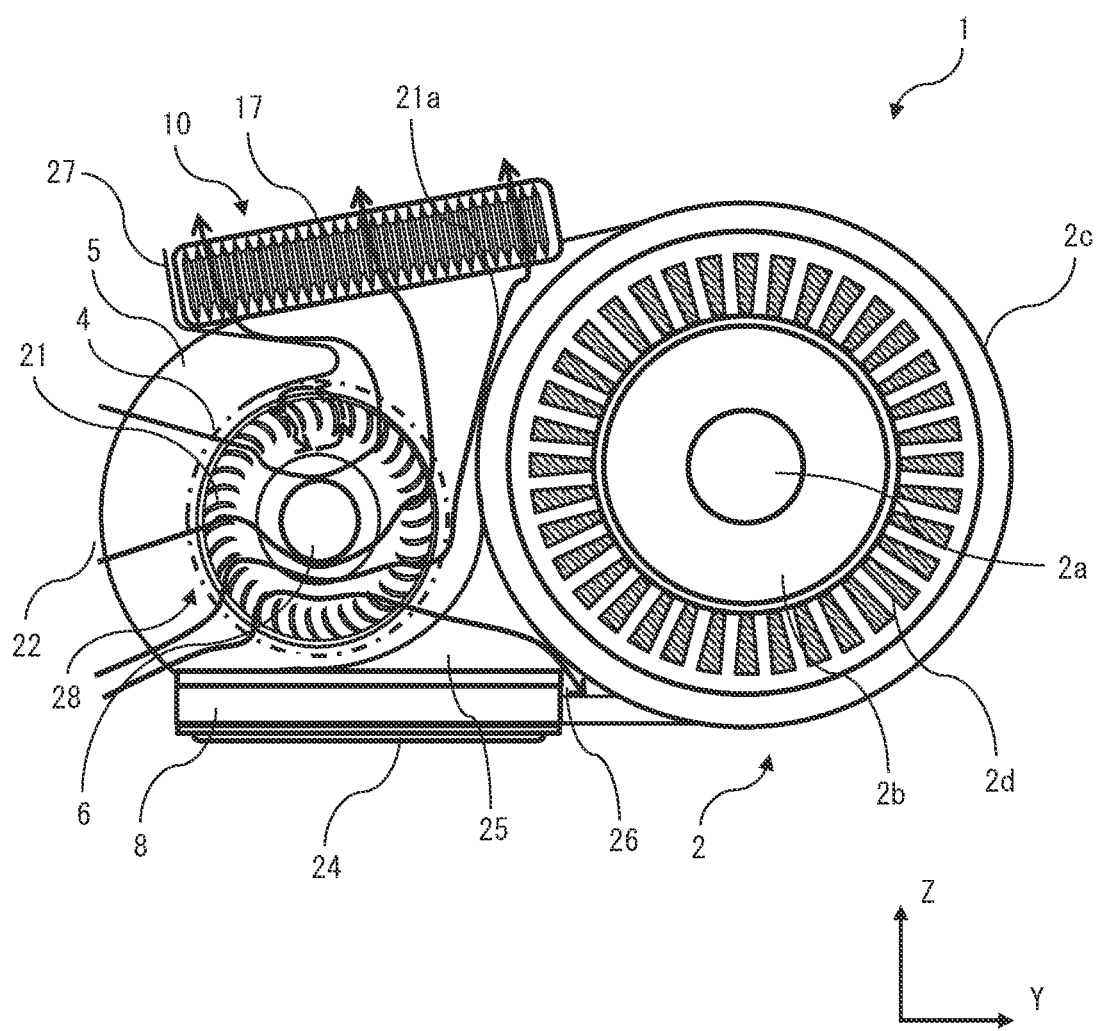
FIG. 15 is a sectional view schematically showing the electric vehicle driving device according to the fourth embodiment.
Figure 16:
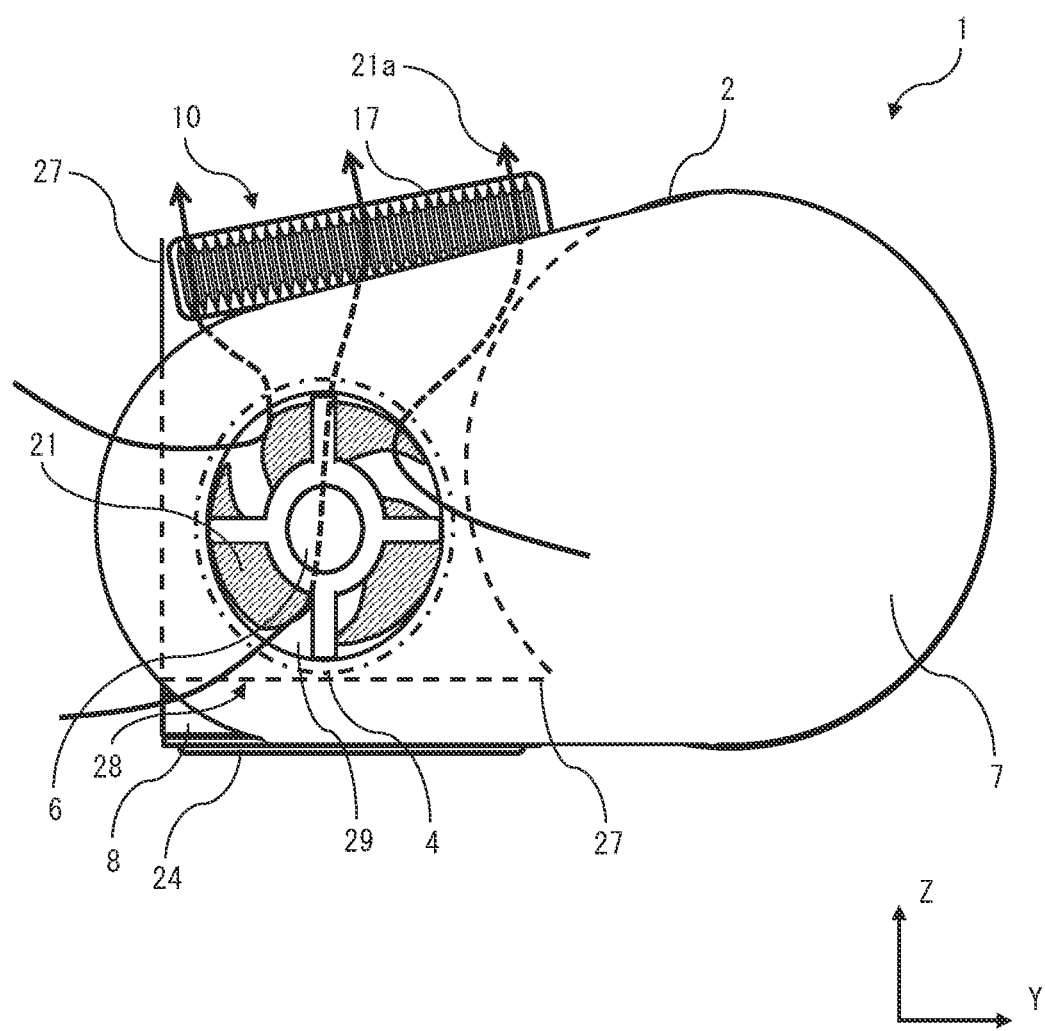
FIG. 16 is a side view schematically showing the electric vehicle driving device according to the fourth embodiment.

An electric vehicle driving device 1 according to the fourth embodiment of the present disclosure will be described. FIG. 13 is a side view schematically showing the electric vehicle driving device 1 according to the fourth embodiment as seen from the other side in the X direction. FIG. 14 is a sectional view schematically showing the electric vehicle driving device 1 when cut along a YZ plane. FIG. 15 is a sectional view schematically showing the electric vehicle driving device 1 when cut along a YZ plane. FIG. 16 is a side view schematically showing the electric vehicle driving device 1 as seen from the other side in the X direction. In the electric vehicle driving device 1 according to the fourth embodiment, a flow path for air is formed around the impeller 21 by a casing 27.

The electric vehicle driving device 1 further includes the casing 27 covering a part around the impeller 21 and forming a flow path for air flowing into and out from the impeller 21. As described above, an air passage is formed by the inverter 8, the motor 2, the gear box 5, and the support structure 7, and air flowing inward through the opening surface 22 passes through the impeller 21 and then the radiator 10. Since the electric vehicle driving device 1 further includes the casing 27, the flow path for air flowing into and out from the impeller 21 is further defined, so that the air sending efficiency of the fan 28 is improved, whereby the electric vehicle driving device 1 can be more efficiently cooled.

In general, types of the fan 28 for forming the flow path for air by rotating the impeller 21 are classified into an axial-flow type, a mixed-flow type, a centrifugal type, and a cross-flow type. In each type, a flow path for air flowing into the impeller 21 and a flow path for air flowing out from the impeller 21 are different. Therefore, the electric vehicle driving device 1 has the casing 27 corresponding to each type. Hereinafter, configuration examples of the electric vehicle driving device 1 including the casing 27 will be described.

The type of the fan 28 shown in FIG. 13 is a centrifugal type (sirocco fan). In the centrifugal type, air flows into the impeller from either or both of the one side and the other side in the extending direction of the driving shaft. The air flowing into the impeller flows toward the radially outer side from the fan. In the configuration shown in FIG. 13, the impeller 21 does not directly contact with the final gear shaft 6, an outer frame portion surrounding the impeller 21 and fixed to the impeller 21 contacts with the final gear shaft 6, and the impeller 21 rotates integrally with the final gear shaft 6 together with the outer frame portion.

The configuration of the casing 27 shown in FIG. 13 will be described. The electric vehicle driving device 1 includes the casing 27 provided on both of the one side in the Y direction and the other side in the Y direction with respect to the final gear shaft 6. The casing 27 is formed with any distances provided from the gear box 5 side and the support structure 7 side, on the other side in the Y direction with respect to the final gear shaft 6, so that inlets 29 for sucking air are formed on the gear box 5 side and the support structure 7 side of the final gear shaft 6 which is the driving shaft. The casing 27 has, between the radiator 10 and the impeller 21, a throat portion 30 protruding toward the one side in the Y direction. The throat portion 30 adjusts the direction of the airflow 21a. The inlet 29 may be provided on only one of the gear box 5 side and the support structure 7 side, instead of being provided on both sides. The casing 27 on the one side in the Y direction with respect to the final gear shaft 6 is formed along the periphery of the impeller 21 and extends toward the one side in the Y direction of the radiator 10.

With the casing 27 fixed to the electric vehicle driving device 1 as described above, the fan 28 of a general centrifugal type is formed, whereby the airflow 21a shown in FIG. 13 is formed, so that the air sending efficiency of the fan 28 can be improved. Since the air sending efficiency of the fan 28 is improved, the electric vehicle driving device 1 can be more efficiently cooled.

The type of the fan 28 shown in FIG. 14 is a cross-flow type (cross-flow fan). In the cross-flow type, air flows into the impeller 21 from the radially outer side of the fan 28. The air flowing into the impeller 21 flows toward the radially outer side from the fan 28. In the configuration shown in FIG. 14, the impeller 21 does not directly contact with the final gear shaft 6, an outer frame portion surrounding the impeller 21 and fixed to the impeller 21 contacts with the final gear shaft 6, and the impeller 21 rotates integrally with the final gear shaft 6 together with the outer frame portion. The impeller 21 is provided at a part between the gear box 5 and the support structure 7.

The configuration of the casing 27 shown in FIG. 14 will be described. The electric vehicle driving device 1 includes two casings 27. The casing 27 covering a part on the other side in the Y direction between the radiator 10 and the impeller 21 is provided at a part between the radiator 10 and the impeller 21. The casing 27 has, on the other side in the Z direction, the throat portion 30 protruding toward the one side in the Y direction. The other casing 27 is further provided on the one side in the Y direction and the other side in the Z direction with respect to the final gear shaft 6, so as to be formed around the impeller 21 and in contact with the motor 2.

With the casings 27 provided as described above, a smooth air passage through which the airflow 21a passes is formed between the motor 2 and the impeller 21. In the cross-flow type, with the throat portion 30 as a boundary, air is sucked from a circumferential part on the other side in the Y direction of the impeller 21 and is discharged from a circumferential part on the one side in the Y direction of the impeller 21. Thus, a two-dimensional unidirectional airflow can be produced, whereby an air-passing configuration with very small pressure loss and very high efficiency can be formed. In addition, there is no stagnation part (accumulation part) inside the casings 27, and therefore rainwater and dust are readily discharged to the outside of the casings 27. In particular, while rainwater and dust are hardly discharged when the electric vehicle 9 travels forward, there is a case where rainwater and dust are readily discharged when the impeller 21 reversely rotates during rearward traveling. If the casing 27 has such a form that rainwater and dust are likely to be accumulated inside the casing 27, it is desirable to provide an opening for discharging rainwater and dust at the bottom of the casing 27.

The type of the fan 28 shown in FIG. 15 is a cross-flow type (cross-flow fan) and this cross-flow-type configuration is different from that shown in FIG. 14. Between the configurations shown in FIG. 14 and FIG. 15, the position where the inverter 8 is provided is different. In FIG. 15, the inverter 8 is provided on the other side in the Z direction with respect to the final gear shaft 6. An air passage is formed by the inverter 8, the motor 2, the gear box 5, the support structure 7, and the casings 27. A part on the one side in the Z direction of the inverter 8 shown in FIG. 15 serves a role as a part of the casing 27 contacting with the motor 2 shown in FIG. 14. In a case where the type of the fan 28 is the cross-flow type shown in FIG. 14 or FIG. 15, the throat portion 30 serves an important role regarding the air sending capability of the fan 28.

The type of the fan 28 shown in FIG. 16 is an axial-flow type. In the axial-flow type, air flows into the impeller from a part on one side in the extending direction of the driving shaft. The air flowing into the impeller flows out from the other side in the extending direction of the driving shaft. In the configuration shown in FIG. 16, the impeller 21 with a plurality of blades is provided in direct contact with the final gear shaft 6 and the impeller 21 rotates integrally with the final gear shaft 6. The support structure 7 has an opening around a part supporting the final gear shaft 6. The opening is the inlet 29 for air flowing into the impeller 21.

The configuration of the casing 27 shown in FIG. 16 will be described. The electric vehicle driving device 1 includes two casings 27. The inverter 8 is provided on the other side in the Z direction with respect to the final gear shaft 6. The casing 27 covering a part on the other side in the Y direction with respect to the final gear shaft 6, between the radiator 10 and the inverter 8, is provided. The casing 27 covering a gap between the inverter 8 and the motor 2 is further provided.

With the casings 27 provided as described above, an air passage which is a space surrounded by the casings 27, the inverter 8, and the motor 2 is formed around the final gear shaft 6. Air sucked through the inlet 29 is pressurized through rotation of the impeller 21 and is sent to an air passage part which is a wake region of the impeller 21. A pressure difference arises between the air passage part and the air around the electric vehicle driving device 1, so that the airflow 21*a* passing through the radiator 10 is produced with the pressure difference used as a driving force, whereby the radiator 10 can be efficiently cooled.

In the configuration of the electric vehicle driving device 1 shown in FIG. 13, the casing 27 is provided so that the inlets 29 for sucking air are formed on the gear box 5 side and the support structure 7 side of the final gear shaft 6 which is the driving shaft, but the configuration is not limited thereto. Also in the configuration of the electric vehicle driving device 1 shown in FIG. 13, the inlet 29 for air flowing into the impeller 21 may be provided around a part supporting the final gear shaft 6 in the support structure 7, as in the configuration shown in FIG. 16.

As described above, the electric vehicle driving device 1 according to the fourth embodiment further includes the casing 27 covering a part around the impeller 21 and forming a flow path for air flowing into and out from the impeller 21. Thus, the flow path for air flowing into and out from the impeller 21 is further defined, so that the air sending efficiency of the fan 28 is improved, whereby the electric vehicle driving device 1 can be more efficiently cooled.

The support structure 7 may have an opening around a part supporting the final gear shaft 6, and the opening is the inlet 29 for air flowing into the impeller 21. Thus, the fan 28 of an axial-flow type is formed, so that the airflow 21*a* passing through the radiator 10 is produced with the pressure difference used as a driving force, whereby the radiator 10 can be efficiently cooled.

Fifth Embodiment

Figure 17:
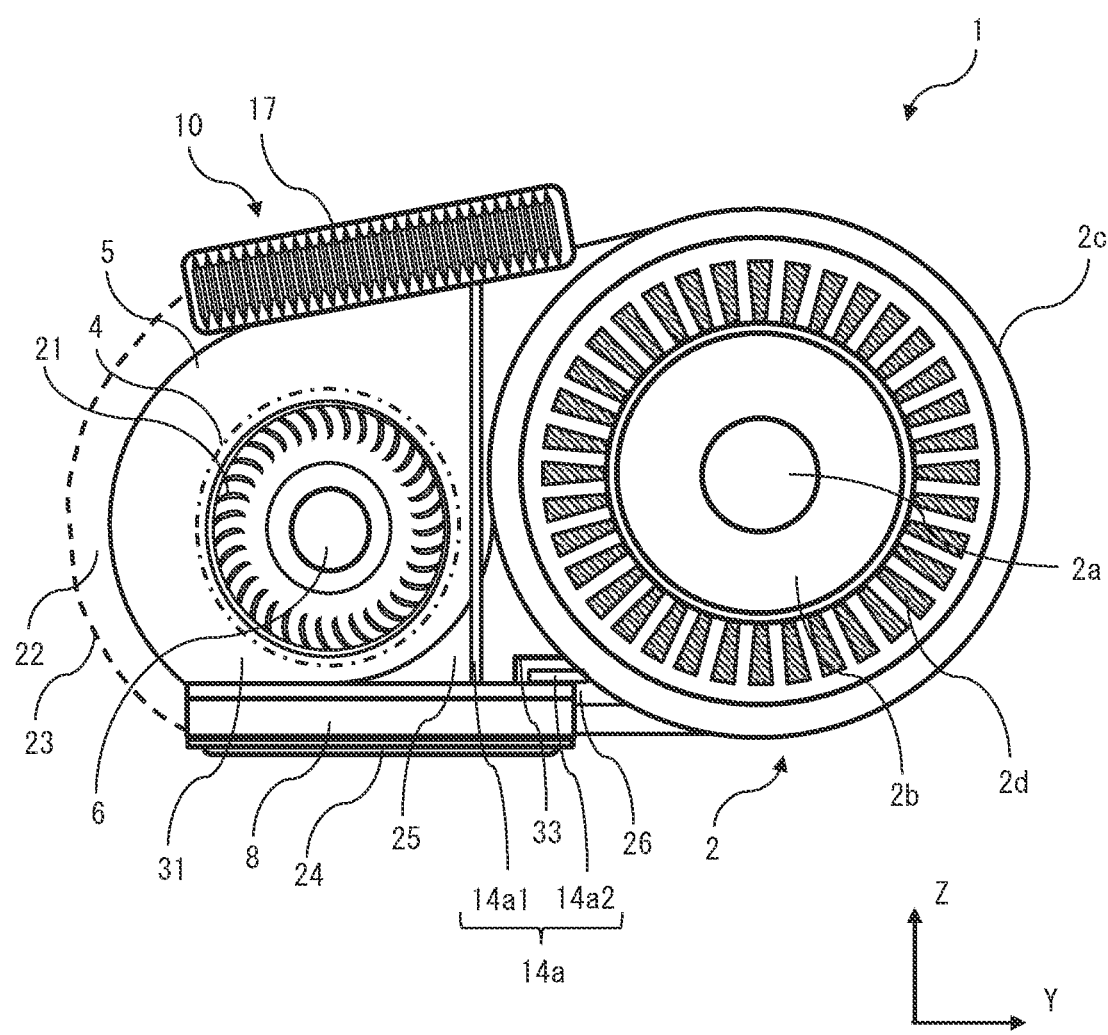
FIG. 17 is a sectional view schematically showing an electric vehicle driving device according to the fifth embodiment of the present disclosure.

An electric vehicle driving device 1 according to the fifth embodiment of the present disclosure will be described. FIG. 17 is a sectional view schematically showing the electric vehicle driving device 1 according to the fifth embodiment when cut along a YZ plane. In the electric vehicle driving device 1 according to the fifth embodiment, the pipes 14*a* and wiring 33 are arranged at a part around the final gear shaft 6.

In the electric vehicle driving device 1 according to the present embodiment, the motor 2 and the inverter 8 are electrically connected by the wiring 33. Either or both of, pipes 14*a*1, 14*a*2 as the pipes 14*a*, and the wiring 33, are arranged at a part around the final gear shaft 6 between the gear box 5 and the support structure 7. The electric vehicle driving device 1 shown in FIG. 17 includes the cooling flow path shown in FIG. 4. The electric vehicle driving device 1 includes the pipe 14*a*1 connecting the radiator 10 and the inverter 8, and the pipe 14*a*2 connecting the inverter 8 and the motor 2. The part around the final gear shaft 6 between the gear box 5 and the support structure 7 is a space 31, and the pipe 14*a*1 and the pipe 14*a*2 are stored in the space 31. In the electric vehicle driving device 1 shown in FIG. 17, the wiring 33 connecting the motor 2 and the inverter 8 is further stored in the space 31. Without limitation to the configuration in which both of the pipes 14*a* and the wiring 33 are stored in the space 31, either of them may be stored in the space 31. The wiring 33 stored in the space 31 is not limited to the wiring connecting the motor 2 and the inverter 8.

In the present embodiment, the space 31 is a part surrounded by the gear box 5, the support structure 7, the radiator 10, the inverter 8, the motor 2, and the cover 23. The configuration of the space 31 is not limited thereto. In a case where the electric vehicle driving device 1 further includes the casing 27, the space 31 may be a part surrounded by the casing 27 in addition to the above members.

The space 31 partially has portions communicating with the outside space via a gap and an air-passage opening of the cover 23. However, since the space 31 has such a structure that the inside is protected by being surrounded by members, the space 31 does not experience contact with an external device or a person. Therefore, the pipes 14*a* and the wiring 33 stored in the space 31 are less likely to experience failure such as breakage by contact. Thus, by placing the pipes 14*a* and the wiring 33 in the space 31, it is possible to protect the pipes 14*a* and the wiring 33 from breakage by contact.

In addition, in a case where parts having small strengths, such as the pipes 14*a* and the wiring 33, are stored in the space 31, there is no such concern that the parts might contact with a worker, a working device/tool, or the like at the time of attaching the electric vehicle driving device 1 to the electric vehicle 9, and mounting work to the vehicle can be easily performed. In addition, the pipes 14*a* and the wiring 33 can be assuredly protected from the outside environment during traveling. In addition, since vibration is smaller at a part closer to the center of the electric vehicle driving device 1, a vibration force applied to the pipes 14*a* and the wiring 33 in the space 31 is small and thus failure of the pipes 14*a* and the wiring 33 due to vibration can be suppressed. In addition, members and the like for reducing the vibration force can be decreased, whereby the weight and the size of the electric vehicle driving device 1 can be reduced.

Sixth Embodiment

Figure 18:
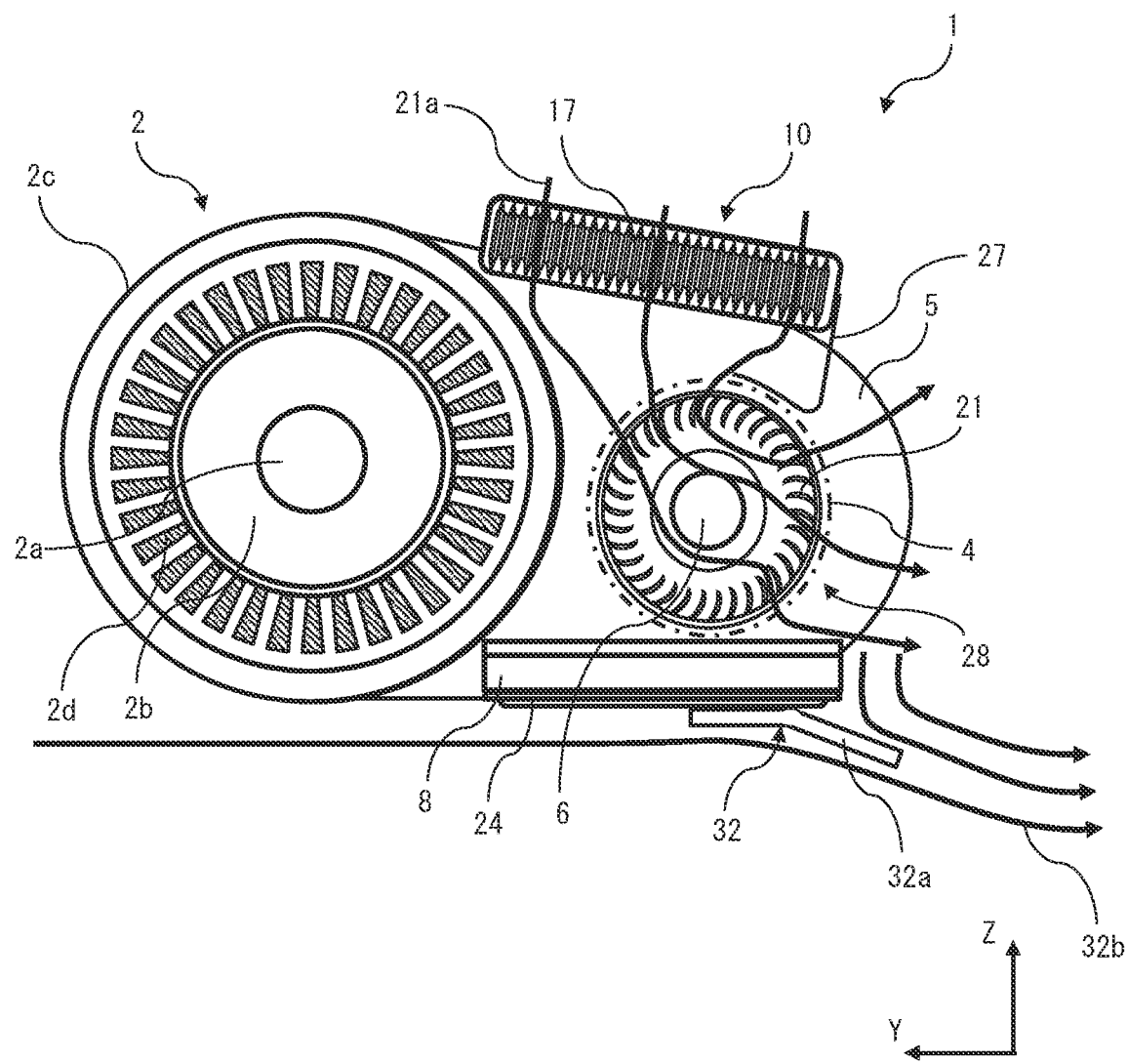
FIG. 18 is a sectional view schematically showing an electric vehicle driving device according to the sixth embodiment of the present disclosure.
Figure 19:
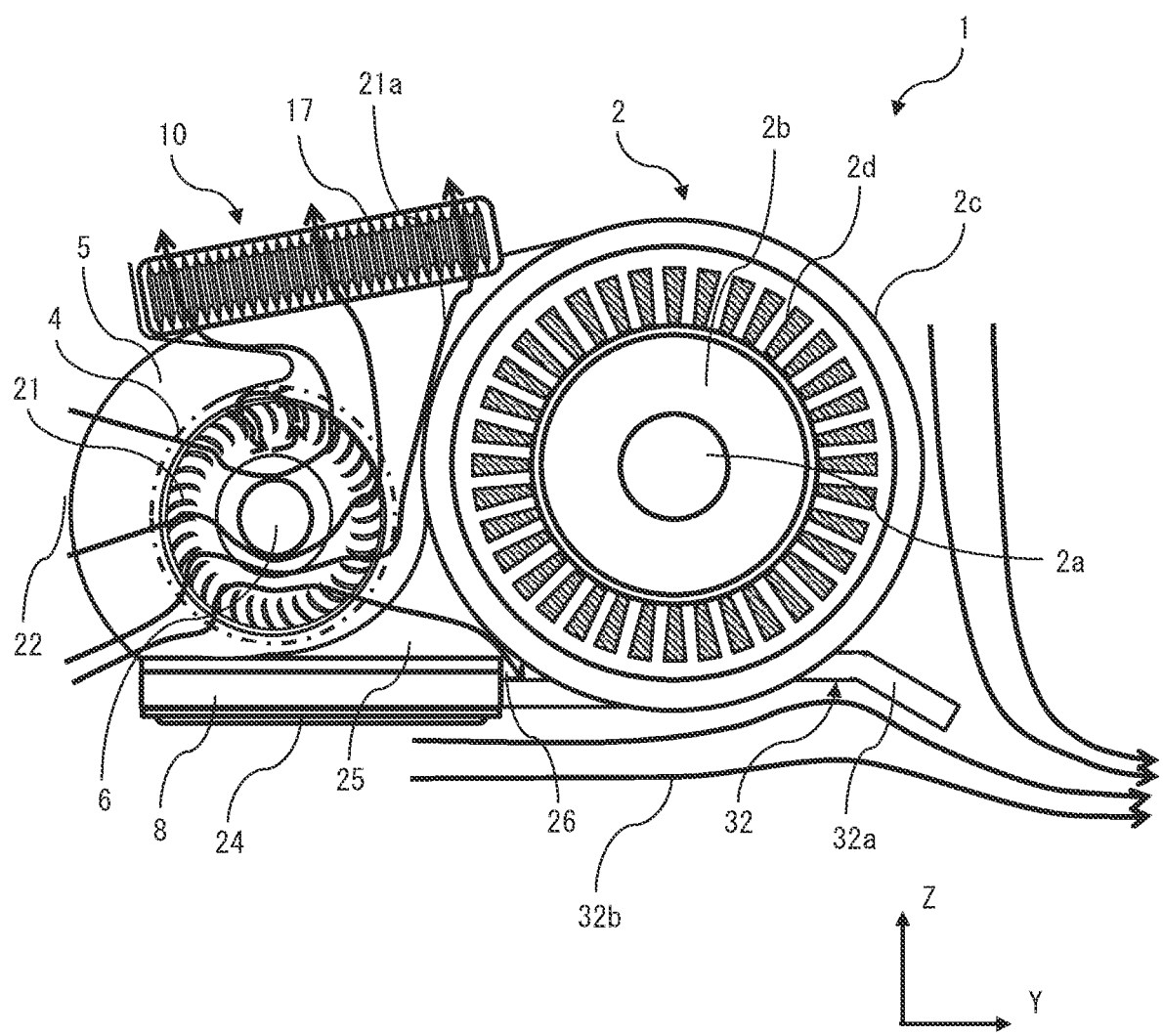
FIG. 19 is a sectional view schematically showing the electric vehicle driving device according to the sixth embodiment.

An electric vehicle driving device 1 according to the sixth embodiment of the present disclosure will be described. FIG. 18 is a sectional view schematically showing the electric vehicle driving device 1 according to the sixth embodiment when cut along a YZ plane. FIG. 19 is a sectional view schematically showing the electric vehicle driving device 1 when cut along a YZ plane. In FIG. 18, the one side in the Y direction is the advancement direction of the electric vehicle, and in FIG. 19, the other side in the Y direction is the advancement direction of the electric vehicle. In these drawings, a road surface (not shown) is present on the other side in the Z direction. In the electric vehicle driving device 1 according to the sixth embodiment, an air-guide plate 32 is provided at a lower end on the downstream side with respect to the advancement direction of the electric vehicle.

The electric vehicle driving device 1 further includes the air-guide plate 32 provided at a road-surface-side part on the side opposite to the advancement direction of the electric vehicle in a state in which the electric vehicle driving device 1 is mounted to the electric vehicle, the air-guide plate 32 having a slope portion 32*a* that approaches a road surface as going toward the side opposite to the advancement direction of the electric vehicle. With this configuration, an airflow 32*b* which is traveling wind passing in the downstream direction on the other side in the Z direction of the electric vehicle is pushed toward the road surface, so that the wake of the air-guide plate 32 can be made to have a negative pressure. Since the wake of the air-guide plate 32 has a negative pressure, air around the electric vehicle driving device 1, in particular, air on the vertically upper side of the air-guide plate 32 and rearward of the electric vehicle driving device 1 is drawn to the rear side of the air-guide plate 32, whereby air to the downstream side of the electric vehicle can be easily discharged.

A configuration example of the electric vehicle driving device 1 provided with the air-guide plate 32 will be described. In the electric vehicle driving device 1 shown in FIG. 18, the motor 2 is provided on the advancement-direction side of the electric vehicle, the radiator 10 is provided on the one side in the Z direction with respect to the final gear shaft 6, the inverter 8 is provided on the other side in the Z direction with respect to the final gear shaft 6, and the other side in the Y direction with respect to the final gear shaft 6 is opened. The air-guide plate 32 is provided at a part on the other side in the Y direction and the other side in the Z direction of the inverter 8. The electric vehicle driving device 1 includes the casing 27 on the other side in the Y direction at a part between the impeller 21 and the radiator 10. The type of the fan 28 is a cross-flow type.

With this configuration, flow of air can be blocked on the side where the inverter 8 is provided, and the side where the radiator 10 is provided can be used as an air suction side. Air is discharged through an opened part on the other side in the Y direction with respect to the final gear shaft 6. An air passage is formed by the inverter 8, the motor 2, the gear box 5, and the support structure 7, and the unidirectional airflow 21a can be formed. Since the unidirectional airflow 21a is formed, low-temperature air is stably supplied to the radiator 10, whereby the electric vehicle driving device 1 can be more efficiently cooled.

In the electric vehicle driving device 1 shown in FIG. 19, the motor 2 is provided on the side opposite to the advancement direction of the electric vehicle, the radiator 10 is provided on the one side in the Z direction with respect to the final gear shaft 6, the inverter 8 is provided on the other side in the Z direction with respect to the final gear shaft 6, and the other side in the Y direction with respect to the final gear shaft 6 is the opening surface 22. The air-guide plate 32 is provided at a part on the one side in the Y direction and the other side in the Z direction of the motor 2. The other configurations of the electric vehicle driving device 1 in FIG. 19 are the same as those of the electric vehicle driving device 1 shown in FIG. 15.

Between the electric vehicle driving device 1 in FIG. 18 and the electric vehicle driving device 1 in FIG. 19, the direction of the airflow 21a passing through the radiator 10 is different. However, the airflow 21a may have any direction as long as the unidirectional airflow 21a is formed. In addition, the side where the opening of the air passage is provided may be the advancement-direction side of the electric vehicle or the side opposite to the advancement direction. In addition, the mounting position of the electric vehicle driving device 1 may be on the front side or the rear side of the electric vehicle.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

Hereinafter, modes of the present disclosure are summarized as additional notes.

Additional Note 1

An electric vehicle driving device comprising:
a motor having a rotary shaft;
a gear box storing a speed reduction mechanism connected to the rotary shaft, and a differential mechanism connected to the speed reduction mechanism;
a final gear shaft of which one side is connected to the differential mechanism;
a support structure supporting another side of the final gear shaft and fixed to the motor; and
a radiator which cools the motor, wherein
the motor and the final gear shaft are arranged so as to be opposed to each other with an interval provided therebetween,
an extending direction of the final gear shaft is defined as an X direction, a direction which is perpendicular to the X direction and in which the motor is provided with respect to the final gear shaft is defined as one side in a Y direction, and a direction perpendicular to the X direction and the Y direction is defined as a Z direction,
the gear box is provided on one side in the X direction of the motor and the final gear shaft, and the support structure is provided on another side in the X direction of the motor and the final gear shaft, and
the radiator is provided on any one or two direction sides of another side in the Y direction, one side in the Z direction, and another side in the Z direction with respect to the final gear shaft.

Additional Note 2

The electric vehicle driving device according to additional note 1, wherein
the radiator is an air-cooled refrigerant cooler,
the electric vehicle driving device further comprises:
a cooling liquid pump and a reservoir tank connected in series to the air-cooled refrigerant cooler by a pipe through which a cooling liquid as a refrigerant flows; and
an inverter which is electrically connected to the motor and converts power,
a cooling liquid path is formed such that the cooling liquid stored in the reservoir tank circulates in order of the cooling liquid pump, the air-cooled refrigerant cooler, and then the reservoir tank, and
a part of the pipe on the cooling liquid path between the air-cooled refrigerant cooler and the reservoir tank is provided in series so as to pass through the inverter and the motor in this order or in parallel so as to pass through the inverter and the motor in parallel.

Additional Note 3

The electric vehicle driving device according to additional note 1, wherein
the radiator is an air-cooled refrigerant cooler,
the electric vehicle driving device further comprises:
a cooling liquid pump, a reservoir tank, and a refrigerant-oil heat exchanger connected in series to the air-cooled refrigerant cooler by a pipe through which a cooling liquid as a refrigerant flows; and an inverter which is electrically connected to the motor and converts power, a cooling liquid path is formed such that the cooling liquid stored in the reservoir tank circulates in order of the cooling liquid pump, the air-cooled refrigerant cooler, the refrigerant-oil heat exchanger, and then the reservoir tank, and a part of the pipe on the cooling liquid path between the air-cooled refrigerant cooler and the refrigerant-oil heat exchanger is provided so as to pass through the inverter.

Additional Note 4

The electric vehicle driving device according to additional note 1, wherein the radiator is an air-cooled oil cooler, the electric vehicle driving device further comprises:

a cooling liquid pump connected in series to the air-cooled oil cooler by a pipe through which a cooling liquid as a refrigerant flows; and an inverter which is electrically connected to the motor and converts power, the cooling liquid pump is provided to the gear box, a cooling liquid path is formed such that the cooling liquid accumulated at a bottom of the gear box circulates in order of the cooling liquid pump, the air-cooled oil cooler, and then the gear box, and a part of the pipe on the cooling liquid path between the air-cooled oil cooler and the gear box is provided in series so as to pass through the inverter and the motor in this order or in parallel so as to pass through the inverter and the motor in parallel.

Additional Note 5

The electric vehicle driving device according to additional note 1, further comprising:

a plurality of heat pipes each having a heat dissipation portion on one side and a heat reception portion on another side; and an inverter which is electrically connected to the motor and converts power, wherein the radiator is the heat dissipation portions each having a plurality of heat pipe heat-dissipation fins, and the heat reception portions are thermally connected to either or both of the motor and the inverter.

Additional Note 6

The electric vehicle driving device according to any one of additional notes 1 to 5, wherein the final gear shaft has an impeller which rotates integrally with the final gear shaft.

Additional Note 7

The electric vehicle driving device according to any one of additional notes 1 to 6, further comprising an inverter which is electrically connected to the motor and converts power, wherein the radiator is provided on any one direction side of the other side in the Y direction, the one side in the Z direction, and the other side in the Z direction with respect to the final gear shaft, and the inverter is provided on a side where the radiator is not provided and which is any one direction side of the other side in the Y direction, the one side in the Z direction, and the other side in the Z direction with respect to the final gear shaft.

Additional Note 8

The electric vehicle driving device according to additional note 7, wherein the Z direction is a vertical direction, the one side in the Z direction is defined as a vertically upper side, and the other side in the Z direction is defined as a vertically lower side, the inverter is provided on the other side in the Z direction with respect to the final gear shaft, and the inverter has an attachable/detachable lid on the other side in the Z direction.

Additional Note 9

The electric vehicle driving device according to additional note 7 or 8, further comprising a cover provided on a side where the radiator and the inverter are not provided and which is any one direction side of the other side in the Y direction, the one side in the Z direction, and the other side in the Z direction with respect to the final gear shaft, the cover having an air-passage opening through which air flows inward.

Additional Note 10

The electric vehicle driving device according to any one of additional notes 7 to 9, wherein either or both of the motor and the inverter have a plurality of heat-dissipation fins at parts on the final gear shaft side.

Additional Note 11

The electric vehicle driving device according to additional note 10, wherein the inverter is provided on the one side in the Z direction or the other side in the Z direction with respect to the final gear shaft, and the motor and the inverter are located with a gap provided therebetween.

Additional Note 12

The electric vehicle driving device according to any one of additional notes 7 to 11, wherein the inverter has a plurality of heat-dissipation fins at a part on a side opposite to the final gear shaft side.

Additional Note 13

The electric vehicle driving device according to additional note 6, further comprising a casing covering a part around the impeller and forming a flow path for air flowing into and out from the impeller.

Additional Note 14

The electric vehicle driving device according to additional note 13, wherein the support structure has an opening around a part supporting the final gear shaft, and
the opening is an inlet for air flowing into the impeller.

Additional Note 15

The electric vehicle driving device according to any one of additional notes 2 to 4, wherein
the motor and the inverter are electrically connected by wiring, and
either or both of the pipe and the wiring are arranged at a part around the final gear shaft between the gear box and the support structure.

Additional Note 16

The electric vehicle driving device according to any one of additional notes 1 to 15, further comprising an air-guide plate provided at a road-surface-side part on a side opposite to an advancement direction of an electric vehicle in a state in which the electric vehicle driving device is mounted to the electric vehicle, the air-guide plate having a slope portion that approaches a road surface as going toward the side opposite to the advancement direction of the electric vehicle.

DESCRIPTION OF THE REFERENCE CHARACTERS 1 electric vehicle driving device
2 motor
2a rotary shaft
2b rotor
2c housing
2d stator
3 speed reduction mechanism
4 differential mechanism
5 gear box
6 final gear shaft
7 support structure
8 inverter
9 electric vehicle
10 radiator
11 cooling liquid
12 cooling liquid pump
13 reservoir tank
14 cooling liquid path
14a, 14a1, 14a2 pipe
15 refrigerant-oil heat exchanger
16 heat dissipation portion
17 heat pipe heat-dissipation fin
18 heat reception portion
19 heat pipe
20 additional heat pipe
21 impeller
21a airflow
22 opening surface
23 cover
24 lid
25, 25a heat-dissipation fin
26 gap
27 casing
28 fan
29 inlet
30 throat portion
31 space
32 air-guide plate
32a slope portion
32b airflow
33 wiring

What is claimed is:

1. An electric vehicle driving device comprising:
a motor having a rotary shaft;
a gear box storing a speed reduction mechanism connected to the rotary shaft, and a differential mechanism connected to the speed reduction mechanism;
a final gear shaft of which one side is connected to the differential mechanism;
a support structure supporting another side of the final gear shaft and fixed to the motor; and
a radiator which cools the motor, wherein
the motor and the final gear shaft are arranged so as to be opposed to each other with an interval provided therebetween,
an extending direction of the final gear shaft is defined as an X direction, a direction which is perpendicular to the X direction and in which the motor is provided with respect to the final gear shaft is defined as one side in a Y direction, and a direction perpendicular to the X direction and the Y direction is defined as a Z direction,
the gear box is provided on one side in the X direction of the motor and the final gear shaft, and the support structure is provided on another side in the X direction of the motor and the final gear shaft, and
the radiator is provided on any one or two direction sides of another side in the Y direction, one side in the Z direction, and another side in the Z direction with respect to the final gear shaft.

2. The electric vehicle driving device according to claim 1, wherein
the radiator is an air-cooled refrigerant cooler,
the electric vehicle driving device further comprises:
a cooling liquid pump and a reservoir tank connected in series to the air-cooled refrigerant cooler by a pipe through which a cooling liquid as a refrigerant flows; and
an inverter which is electrically connected to the motor and converts power,
a cooling liquid path is formed such that the cooling liquid stored in the reservoir tank circulates in order of the cooling liquid pump, the air-cooled refrigerant cooler, and then the reservoir tank, and
a part of the pipe on the cooling liquid path between the air-cooled refrigerant cooler and the reservoir tank is provided in series so as to pass through the inverter and the motor in this order or in parallel so as to pass through the inverter and the motor in parallel.

3. The electric vehicle driving device according to claim 1, wherein
the radiator is an air-cooled refrigerant cooler,
the electric vehicle driving device further comprises:
a cooling liquid pump, a reservoir tank, and a refrigerant-oil heat exchanger connected in series to the air-cooled refrigerant cooler by a pipe through which a cooling liquid as a refrigerant flows; and
an inverter which is electrically connected to the motor and converts power,
a cooling liquid path is formed such that the cooling liquid stored in the reservoir tank circulates in order of the cooling liquid pump, the air-cooled refrigerant cooler, the refrigerant-oil heat exchanger, and then the reservoir tank, and
a part of the pipe on the cooling liquid path between the air-cooled refrigerant cooler and the refrigerant-oil heat exchanger is provided so as to pass through the inverter.

4. The electric vehicle driving device according to claim 1, wherein
the radiator is an air-cooled oil cooler,
the electric vehicle driving device further comprises:
a cooling liquid pump connected in series to the air-cooled oil cooler by a pipe through which a cooling liquid as a refrigerant flows; and
an inverter which is electrically connected to the motor and converts power,
the cooling liquid pump is provided to the gear box,
a cooling liquid path is formed such that the cooling liquid accumulated at a bottom of the gear box circulates in order of the cooling liquid pump, the air-cooled oil cooler, and then the gear box, and
a part of the pipe on the cooling liquid path between the air-cooled oil cooler and the gear box is provided in series so as to pass through the inverter and the motor in this order or in parallel so as to pass through the inverter and the motor in parallel.

5. The electric vehicle driving device according to claim 1, further comprising:
a plurality of heat pipes each having a heat dissipation portion on one side and a heat reception portion on another side; and
an inverter which is electrically connected to the motor and converts power, wherein
the radiator is the heat dissipation portions each having a plurality of heat pipe heat-dissipation fins, and
the heat reception portions are thermally connected to either or both of the motor and the inverter.

6. The electric vehicle driving device according to claim 1, wherein
the final gear shaft has an impeller which rotates integrally with the final gear shaft.

7. The electric vehicle driving device according to claim 1, further comprising an inverter which is electrically connected to the motor and converts power, wherein
the radiator is provided on any one direction side of the other side in the Y direction, the one side in the Z direction, and the other side in the Z direction with respect to the final gear shaft, and
the inverter is provided on a side where the radiator is not provided and which is any one direction side of the other side in the Y direction, the one side in the Z direction, and the other side in the Z direction with respect to the final gear shaft.

8. The electric vehicle driving device according to claim 7, wherein
the Z direction is a vertical direction, the one side in the Z direction is defined as a vertically upper side, and the other side in the Z direction is defined as a vertically lower side,
the inverter is provided on the other side in the Z direction with respect to the final gear shaft, and
the inverter has an attachable/detachable lid on the other side in the Z direction.

9. The electric vehicle driving device according to claim 7, further comprising a cover provided on a side where the radiator and the inverter are not provided and which is any one direction side of the other side in the Y direction, the one side in the Z direction, and the other side in the Z direction with respect to the final gear shaft, the cover having an air-passage opening through which air flows inward.

10. The electric vehicle driving device according to claim 7, wherein
either or both of the motor and the inverter have a plurality of heat-dissipation fins at parts on the final gear shaft side.

11. The electric vehicle driving device according to claim 10, wherein
the inverter is provided on the one side in the Z direction or the other side in the Z direction with respect to the final gear shaft, and
the motor and the inverter are located with a gap provided therebetween.

12. The electric vehicle driving device according to claim 7, wherein
the inverter has a plurality of heat-dissipation fins at a part on a side opposite to the final gear shaft side.

13. The electric vehicle driving device according to claim 6, further comprising a casing covering a part around the impeller and forming a flow path for air flowing into and out from the impeller.

14. The electric vehicle driving device according to claim 13, wherein
the support structure has an opening around a part supporting the final gear shaft, and
the opening is an inlet for air flowing into the impeller.

15. The electric vehicle driving device according to claim 2, wherein
the motor and the inverter are electrically connected by wiring, and
either or both of the pipe and the wiring are arranged at a part around the final gear shaft between the gear box and the support structure.

16. The electric vehicle driving device according to claim 1, further comprising an air-guide plate provided at a road-surface-side part on a side opposite to an advancement direction of an electric vehicle in a state in which the electric vehicle driving device is mounted to the electric vehicle, the air-guide plate having a slope portion that approaches a road surface as going toward the side opposite to the advancement direction of the electric vehicle.

* * * * *